US012719573B2

(12) United States Patent
Soltani et al.

(10) Patent No.: US 12,719,573 B2
(45) Date of Patent: Aug. 25, 2026

(54) SUBBAND-BASED PROCESSING FOR OPTICAL CHANNELS

(71) Applicant: QUALCOMM Incorporated, San Diego, CA (US)

(72) Inventors: Morteza Soltani, San Diego, CA (US); Yisheng Xue, San Diego, CA (US); Xiaoxia Zhang, San Diego, CA (US); Jing Sun, San Diego, CA (US); Junyi Li, Greentown, PA (US); Karoly Becze, Escondido, CA (US); Sam Liu, San Diego, CA (US); Siva Kumar Jujaray, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 18/617,248

(22) Filed: Mar. 26, 2024

(65) Prior Publication Data

US 2025/0309982 A1 Oct. 2, 2025

(51) Int. Cl.
*H04B 10/11* (2013.01)

(52) U.S. Cl.
CPC .................................... *H04B 10/11* (2013.01)

(58) Field of Classification Search
None
See application file for complete search history.

(56) References Cited

U.S. PATENT DOCUMENTS

| | | | | |
|---|---|---|---|---|
| 2023/0387990 | A1 | 11/2023 | Ibrahim et al. | |
| 2024/0056277 | A1 | 2/2024 | Abotabl et al. | |
| 2024/0057050 | A1 * | 2/2024 | Zhang | H04L 5/14 |
| 2024/0057098 | A1 | 2/2024 | Zhang et al. | |

OTHER PUBLICATIONS

International Search Report and Written Opinion—PCT/US2025/020743—ISA/EPO—Jul. 1, 2025 (2401692WO).

* cited by examiner

*Primary Examiner* — David W Lambert
(74) *Attorney, Agent, or Firm* — Holland & Hart LLP

(57) ABSTRACT

Some wireless communications systems may utilize optical wireless communication (OWC) to transmit or receive information. For instance, a first device may communicate with a second device via an OWC link. Some OWC systems may operate in an optical spectrum between approximately $10^{11}$ and $10^{16}$ hertz. Some examples of the techniques described herein may provide communication performance improvements by utilizing frequency-dependent communication structures for OWC. For example, frequency-dependent constellation patterns may be utilized for a codeword. Utilizing frequency-dependent constellation patterns may contrast with some approaches that utilize one modulation and coding scheme (MCS) per codeword. In some aspects, allocated frequency domain resources may be arranged into subbands with different MCSs. In some examples, an optical channel with relatively little or no fading may allow streamlining of channel state or control signaling. For example, MCS patterns may be updated relatively less frequently.

30 Claims, 17 Drawing Sheets

SUBBAND-BASED PROCESSING FOR OPTICAL CHANNELS

FIELD OF TECHNOLOGY

The following relates to wireless communications, including subband-based processing for optical channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

Some wireless communications systems may utilize optical wireless communication (OWC) to transmit or receive information. For instance, a first device, such as a user equipment (UE), may communicate with a second device, such as a network entity, via an OWC link. Some OWC systems may operate in an optical spectrum between approximately $10^{11}$ and $10^{16}$ hertz (Hz). Some examples of the techniques described herein may provide communication performance improvements by utilizing frequency-dependent communication structures for OWC. For example, frequency-dependent constellation patterns may be utilized for a codeword. Utilizing frequency-dependent constellation patterns may contrast with some approaches that utilize one modulation and coding scheme (MCS) per codeword. In some aspects, allocated frequency domain resources may be arranged into subbands with different MCSs. In some examples, an optical channel with relatively little or no fading may allow streamlining of channel state or control signaling (e.g., channel state information (CSI) or downlink control information (DCI) signaling). For example, MCS patterns may be updated relatively less frequently.

A method for wireless communications by a UE is described. The method may include communicating, with a network entity, a first indication of an optical front end (OFE) and a second indication of an operating point for communicating optical signaling via an optical channel with the network entity, communicating, with the network entity, information indicating a configuration of one or more optical subbands associated with the optical channel, the one or more optical subbands being based on the OFE and the operating point, and communicating, with the network entity, one or more optical signals via the optical channel based on the configuration of the one or more optical subbands.

An apparatus for wireless communications at a UE is described. The UE may include one or more processors and instructions stored in one or more memories and executable by the one or more processors, individually or collectively, to cause the apparatus to communicate, with a network entity, a first indication of an OFE and a second indication of an operating point for communicating optical signaling via an optical channel with the network entity, communicate, with the network entity, information indicating a configuration of one or more optical subbands associated with the optical channel, the one or more optical subbands being based on the OFE and the operating point, and communicate, with the network entity, one or more optical signals via the optical channel based on the configuration of the one or more optical subbands.

Another apparatus for wireless communications at a UE is described. The apparatus may include means for communicating, with a network entity, a first indication of an OFE and a second indication of an operating point for communicating optical signaling via an optical channel with the network entity, means for communicating, with the network entity, information indicating a configuration of one or more optical subbands associated with the optical channel, the one or more optical subbands being based on the OFE and the operating point, and means for communicating, with the network entity, one or more optical signals via the optical channel based on the configuration of the one or more optical subbands.

A non-transitory computer-readable medium storing code for wireless communications is described. The code may include instructions executable by one or more processors to communicate, with a network entity, a first indication of an OFE and a second indication of an operating point for communicating optical signaling via an optical channel with the network entity, communicate, with the network entity, information indicating a configuration of one or more optical subbands associated with the optical channel, the one or more optical subbands being based on the OFE and the operating point, and communicate, with the network entity, one or more optical signals via the optical channel based on the configuration of the one or more optical subbands.

In some examples of the method, apparatuses, and non-transitory computer-readable medium described herein, communicating the information indicating the configuration may include operations, features, means, or instructions for communicating an indication of a frequency range and an indication of a location in a resource block for at least one of the one or more optical subbands associated with the optical channel.

In some examples of the method, apparatuses, and non-transitory computer-readable medium described herein, communicating the information indicating the configuration may include operations, features, means, or instructions for communicating an indication of a quantity of the one or more optical subbands associated with the optical channel.

In some examples of the method, apparatuses, and non-transitory computer-readable medium described herein, communicating the information indicating the configuration may include operations, features, means, or instructions for communicating an indication of a first frequency and a second frequency for at least one of the one or more optical subbands associated with the optical channel.

In some examples of the method, apparatuses, and non-transitory computer-readable medium described herein, the OFE and the operating point correspond to the network entity and the optical channel may be a downlink optical channel.

Some examples of the method, apparatuses, and non-transitory computer-readable medium described herein may further include operations, features, means, or instructions for communicating, with the network entity, a third indication of a second OFE corresponding to the UE, and a fourth indication of a second operating point for communicating second optical signaling via an uplink optical channel with the network entity, communicating, with the network entity, second information indicating a second configuration of one or more second optical subbands associated with the uplink optical channel, the one or more second optical subbands being based on the second OFE and the second operating point, and communicating, with the network entity, one or more second optical signals via the uplink optical channel based on the second configuration of the one or more second optical subbands.

Some examples of the method, apparatuses, and non-transitory computer-readable medium described herein may further include operations, features, means, or instructions for communicating, with the network entity, second information indicating a second configuration of one or more transport blocks for communication via the optical channel.

In some examples of the method, apparatuses, and non-transitory computer-readable medium described herein, communicating the second information may include operations, features, means, or instructions for communicating an indication of a mapping between the one or more transport blocks and the one or more optical subbands, each transport block being associated with at least one of the one or more optical subbands.

In some examples of the method, apparatuses, and non-transitory computer-readable medium described herein, communicating the second information may include operations, features, means, or instructions for communicating an indication of a first MCS associated with a first transport block and a first optical subband, and an indication of a second MCS associated with a second transport block and a second optical subband.

In some examples of the method, apparatuses, and non-transitory computer-readable medium described herein, the second MCS associated with the second transport block may be indicated relative to the first MCS associated with the first transport block.

Some examples of the method, apparatuses, and non-transitory computer-readable medium described herein may further include operations, features, means, or instructions for communicating an indication of a mapping of a first modulation order to a first optical subband of the one or more optical subbands.

In some examples of the method, apparatuses, and non-transitory computer-readable medium described herein, a second modulation order corresponding to a second subband may be indicated relative to the first modulation order corresponding to a first subband.

Some examples of the method, apparatuses, and non-transitory computer-readable medium described herein may further include operations, features, means, or instructions for transmitting, to the network entity, an acknowledgment or negative acknowledgment of a first transport block with one or more modulation orders associated with at least one of the one or more optical subbands.

In some examples of the method, apparatuses, and non-transitory computer-readable medium described herein, communicating the one or more optical signals may include operations, features, means, or instructions for receiving a first transport block corresponding to a first optical subband with a first modulation order and a second optical subband with a second modulation order and receiving a second transport block corresponding to a third optical subband with a third modulation order and a fourth optical subband with a fourth modulation order.

In some examples of the method, apparatuses, and non-transitory computer-readable medium described herein, communicating the one or more optical signals may include operations, features, means, or instructions for receiving a first transport block corresponding to a first optical subband via a first layer and receiving a second transport block corresponding to a second optical subband via a second layer.

A method for wireless communications by a network entity is described. The method may include communicating, with a UE, a first indication of an OFE and a second indication of an operating point for communicating optical signaling via an optical channel with the UE, communicating, with the UE, information indicating a configuration of one or more optical subbands associated with the optical channel, the one or more optical subbands being based on the OFE and the operating point, and communicating, with the UE, one or more optical signals via the optical channel based on the configuration of the one or more optical subbands.

An apparatus for wireless communications at a network entity is described. The apparatus may include one or more processors and instructions stored in one or more memories and executable by the one or more processors, individually or collectively, to cause the apparatus to communicate, with a UE, a first indication of an OFE and a second indication of an operating point for communicating optical signaling via an optical channel with the UE, communicate, with the UE, information indicating a configuration of one or more optical subbands associated with the optical channel, the one or more optical subbands being based on the OFE and the operating point, and communicate, with the UE, one or more optical signals via the optical channel based on the configuration of the one or more optical subbands.

Another apparatus for wireless communications is described. The apparatus may include means for communicating, with a UE, a first indication of an OFE and a second indication of an operating point for communicating optical signaling via an optical channel with the UE, means for communicating, with the UE, information indicating a configuration of one or more optical subbands associated with the optical channel, the one or more optical subbands being based on the OFE and the operating point, and means for communicating, with the UE, one or more optical signals via the optical channel based on the configuration of the one or more optical subbands.

A non-transitory computer-readable medium storing code for wireless communications is described. The code may include instructions executable by one or more processors to communicate, with a UE, a first indication of an OFE and a second indication of an operating point for communicating optical signaling via an optical channel with the UE, communicate, with the UE, information indicating a configuration of one or more optical subbands associated with the optical channel, the one or more optical subbands being based on the OFE and the operating point, and communicate, with the UE, one or more optical signals via the optical channel based on the configuration of the one or more optical subbands.

In some examples of the method, apparatuses, and non-transitory computer-readable medium described herein, communicating the information indicating the configuration may include operations, features, means, or instructions for communicating an indication of a frequency range and an indication of a location in a resource block for at least one of the one or more optical subbands associated with the optical channel.

In some examples of the method, apparatuses, and non-transitory computer-readable medium described herein, communicating the information indicating the configuration may include operations, features, means, or instructions for communicating an indication of a quantity of the one or more optical subbands associated with the optical channel.

In some examples of the method, apparatuses, and non-transitory computer-readable medium described herein, communicating the information indicating the configuration may include operations, features, means, or instructions for communicating an indication of a first frequency and a second frequency for at least one of the one or more optical subbands associated with the optical channel.

Some examples of the method, apparatuses, and non-transitory computer-readable medium described herein may further include operations, features, means, or instructions for communicating, with the UE, a third indication of a second OFE corresponding to the UE, and a fourth indication of a second operating point for communicating second optical signaling via an uplink optical channel with the UE, communicating, with the UE, second information indicating a second configuration of one or more second optical subbands associated with the uplink optical channel, the one or more second optical subbands being based on the second OFE and the second operating point, and communicating, with the UE, one or more second optical signals via the uplink optical channel based on the second configuration of the one or more second optical subbands.

Some examples of the method, apparatuses, and non-transitory computer-readable medium described herein may further include operations, features, means, or instructions for communicating, with the UE, second information indicating a second configuration of one or more transport blocks for communication via the optical channel.

In some examples of the method, apparatuses, and non-transitory computer-readable medium described herein, communicating the second information may include operations, features, means, or instructions for communicating an indication of a mapping between the one or more transport blocks and the one or more optical subbands, each transport block being associated with at least one of the one or more optical subbands.

In some examples of the method, apparatuses, and non-transitory computer-readable medium described herein, communicating the second information may include operations, features, means, or instructions for communicating an indication of a first MCS associated with a first transport block and a first optical subband, and an indication of a second MCS associated with a second transport block and a second optical subband.

In some examples of the method, apparatuses, and non-transitory computer-readable medium described herein, a size of a first transport block may be based on a quantity of resource blocks associated with a first optical subband.

Some examples of the method, apparatuses, and non-transitory computer-readable medium described herein may further include operations, features, means, or instructions for communicating an indication of a mapping of a first modulation order to a first optical subband of the one or more optical subbands.

Some examples of the method, apparatuses, and non-transitory computer-readable medium described herein may further include operations, features, means, or instructions for obtaining, from the UE, an acknowledgment or negative acknowledgment of a first transport block with one or more modulation orders associated with at least one of the one or more optical subbands.

In some examples of the method, apparatuses, and non-transitory computer-readable medium described herein, communicating the one or more optical signals may include operations, features, means, or instructions for outputting a first transport block corresponding to a first optical subband with a first modulation order and a second optical subband with a second modulation order and outputting a second transport block corresponding to a third optical subband with a third modulation order and a fourth optical subband with a fourth modulation order.

In some examples of the method, apparatuses, and non-transitory computer-readable medium described herein, communicating the one or more optical signals may include operations, features, means, or instructions for outputting a first transport block corresponding to a first optical subband via a first layer and outputting a second transport block corresponding to a second optical subband via a second layer.

DETAILED DESCRIPTION

Figure 1:
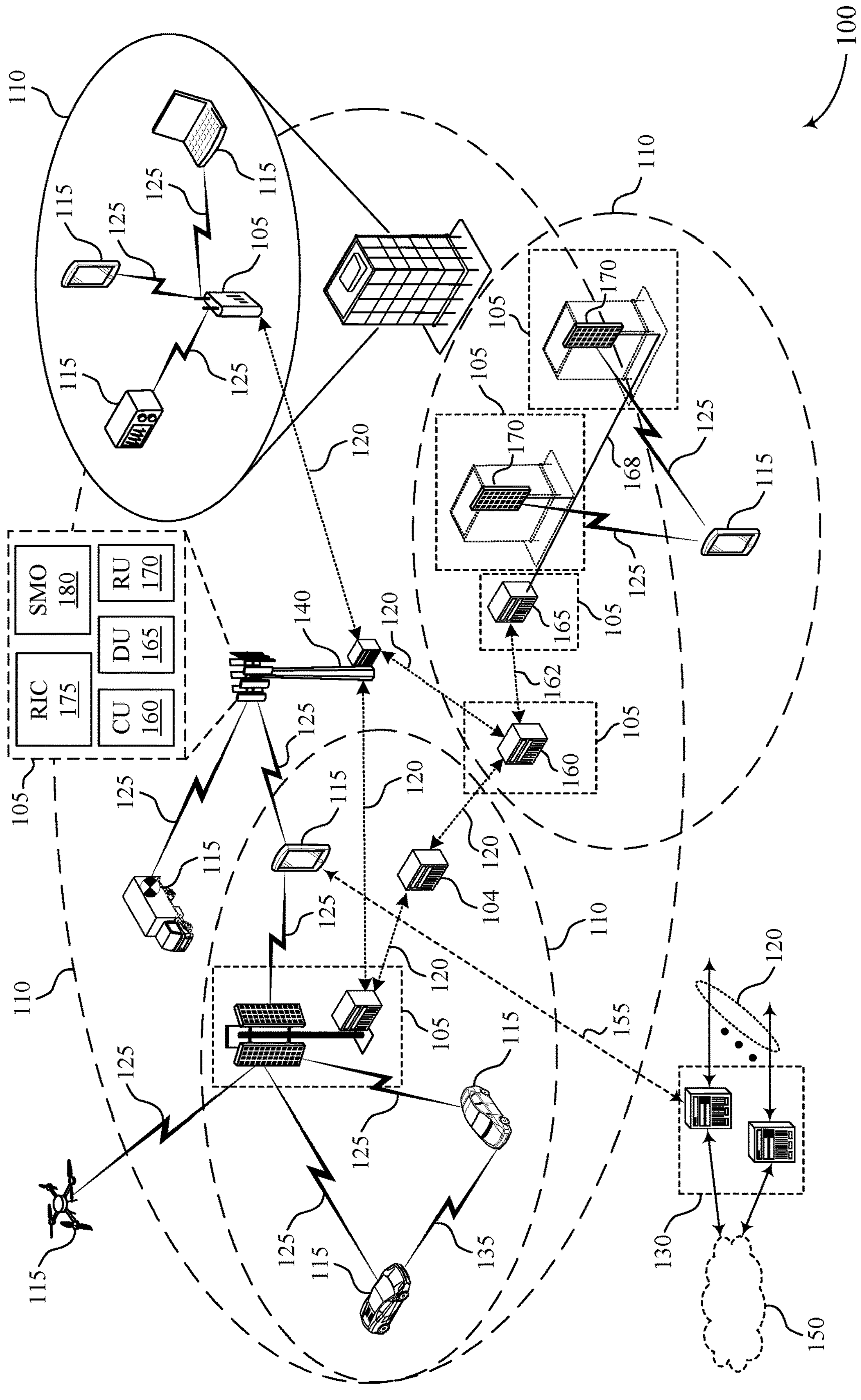
FIG. 1 shows an example of a wireless communications system that supports subband-based processing for optical channels in accordance with one or more aspects of the present disclosure.

Some wireless communications systems may support optical wireless communication (OWC) to transmit or receive information. For instance, a first device, such as a user equipment (UE), may communicate with a second device, such as a network entity, via an OWC link. Some OWC systems may operate in an optical spectrum between approximately $10^{11}$ and $10^{16}$ hertz (Hz). For example, the first device may transmit an optical wireless signal (e.g., a signal in the infrared to ultraviolet spectrum) to the second device via a beam of light using a light source. The second device may receive the optical wireless signal using a photodetector. In some examples, the first device or the second device may include an optical device such as a lens (e.g., a condenser lens), a mirror (e.g., a concave mirror), or other curved optical device that focuses the optical signal for transmission or for reception (e.g., for focusing an optical signal towards the photodetector). One or more light sources or photodetectors may be referred to as an optical front end (OFE) of a device. In some examples, an OFE may include one or more curved optical devices (e.g., lenses or mirrors).

OWC may be envisioned to provide a relatively high data rate, such as 1 terabit per second (Tbps) per link, because it may be difficult to support a 1 Tbps link using a range of radio frequency (RF) (e.g., 100 gigahertz (GHz)) spectrum. For instance, 1 Tbps communications may be targeted for sixth generation (6G) or seventh generation (7G) data rates.

Observations or measurements may demonstrate distortions resulting from device non-idealities (e.g., optical-to-electrical conversion nonlinearities or diode nonlinearities). For instance, frequency selective transmission side-originated distortions may include nonlinearities induced by electrical-to-optical conversions or a light source (e.g., light emitting diode (LED) or laser diode (LD)). In addition to transmission side-originated distortions, a photodetector (e.g., avalanche photodiode (APD) or silicon photomultiplier (SiPM)) may introduce receive side-originated distortions.

Some optical channels may offer relatively little or no fading, while tending to increasingly attenuate signals with increasing frequency. The attenuation characteristic may be referred to as a "low-pass" characteristic, where signals in a relatively lower band may exhibit little or no attenuation, while some relatively higher-frequency signals may be increasingly attenuated as the frequency increases. In one example of a low-pass channel, in relatively lower frequency bands (e.g., in a 200 to 800 megahertz (MHz) range), a degradation of less than 2 decibels (dB) per 100 MHz may occur. In some approaches, a transport block (TB) over this range may meet some end-to-end performance targets. In higher frequency bands (e.g., 800 to 2000 MHz), a loss greater than 4 dB may occur per 100 MHz. Accordingly, a single TB transmission may not provide good performance in the range between 800 and 2000 MHz. For this range, subband based processing (e.g., subband modulation and coding scheme (MCS) adaptation may be useful.

Subband processing in a low-pass OWC channel may be helpful to achieve performance targets. For instance, subband processing may be utilized for an entire bandwidth in a low-pass OWC channel. The subband processing may be utilized to achieve a relatively high data rate (e.g., a throughput greater than or equal to 1 Tbps) for uplink or downlink communications. In some aspects, a narrow beam optical link in OWC may enable space division multiplexing (SDM), where one or more (e.g., all) frequency domain resources may be reused per link in a multi-user system.

Some examples of the techniques described herein may provide communication performance improvements by utilizing frequency-dependent communication structures for OWC. For example, frequency-dependent constellation patterns may be utilized for a codeword. Utilizing frequency-dependent constellation patterns may contrast with some approaches that utilize one MCS per codeword. In some aspects, allocated frequency domain resources may be arranged into subbands with different MCSs. In some examples, an optical channel with relatively little or no fading may allow streamlining of channel state or control signaling (e.g., channel state information (CSI) or downlink control information (DCI) signaling). For example, MCS patterns may be updated relatively less frequently.

Some examples of an optical wireless channel may exhibit one or more attributes. An OWC channel frequency response may be a combination of a light source (e.g., LED or LD) frequency response, an optical wireless channel, and a photodetector frequency response. For instance, a wireless channel between an LED or LD and a photodetector (e.g., APD or SiPM) may exhibit a low-pass characteristic. The low-pass characteristic may occur because the effective wireless channel may be a combination of the LED or LD response, wireless medium, and photodetector response. An electromagnetic channel may be relatively flat or frequency selective, depending on line-of-sight (LOS) or non-line-of-sight (NLOS) conditions. In some cases, the LED or LD and the photodetector (e.g., APD or SiPM) may exhibit a low-pass characteristic. In some examples, light source and photodetector frequency responses may be relatively stable (e.g., may be static or may not change often).

Some examples of the techniques described herein may provide subband-based approaches, where different subbands may be utilized to carry different quantities of bits. In some aspects, different subbands may have different configurations, where the configurations may be based on an OFE of a device (e.g., UE or network entity). In some approaches, TBs may be utilized to transfer data traffic on a downlink, uplink, sidelink, or other link. In some cases, each TB may be encoded with a specific MCS level. A code rate across a TB may be fixed in some approaches. Due to the low pass nature of some OWC channels, a quantity of bits may vary per subband or a variable code rate (e.g., MCS) per subband may be utilized. Given the low-pass behavior of some OWC channels, some examples of the techniques described herein may address the low-pass behavior. Some of the subband-based approaches may be utilized in conjunction with bit allocation approaches as described herein.

Because an OWC channel may depend on one or more OFEs at one or more devices (e.g., a power amplifier (PA) and LED or LD at a network entity 105 and a photodetector at a UE 115, or optical filters at a UE 115 or a network entity 105, among other examples), and the frequency response of OFE components may be relatively stable, a signaling mechanism may be utilized to indicate a channel frequency response for OWC (for a network entity on a downlink or a UE on an uplink, for instance). In some approaches, reference signals (e.g., a channel state information reference signal (CSI-RS) on a downlink or a sounding reference signal (SRS) on an uplink) may be utilized to characterize a channel. Because an OWC channel may be relatively stable, transmission (e.g., frequent or repetitive transmission) of reference signals may be reduced or avoided. In some examples, information indicating one or more OFEs or one or more devices (e.g., light sources, photodetectors, among other examples) used as OFEs may be signaled on an uplink or downlink. The information may be utilized to determine or estimate the OWC channel (e.g., a profile of the OWC channel).

Aspects of the disclosure are initially described in the context of wireless communications systems. Aspects of the disclosure are also described in the context of graphs and a process flow. Aspects of the disclosure are further illustrated by and described with reference to apparatus diagrams, system diagrams, and flowcharts that relate to subband-based processing for optical channels.

FIG. 1 shows an example of a wireless communications system 100 that supports subband-based processing for optical channels in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities

105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, a UE 115 may communicate with a network entity 105 via an OWC link. For example, the network entity 105 may communicate an optical wireless signal with the UE 115 via a beam of light, which may be received and measured using optical components of the UE 115 or network entity 105. Optical components of the UE 115 or network entity 105 may be used to transmit or receive an optical wireless signal. Optical components may include, for example, one or more photodetectors, lenses, or mirrors (e.g., condenser lenses, concave mirrors, or reflectors that may focus the optical wireless signal towards one or more photodetectors). Additionally, or alternatively, the optical components may include one or more light sources, lenses, or mirrors (e.g., condenser lenses, concave mirrors, or reflectors that may collimate optical wireless signals emitted or output by the one or more light sources). One or more optical components or a combination of optical components (e.g., a combination of one or more lenses, one or more mirrors, one or more photodetectors, or one or more light sources, among other examples) may be referred to as an OFE. The UE 115 may include one or more OFEs or the network entity 105 may include one or more OFEs.

In accordance with examples described herein, a UE 115 may support communicating optical wireless signals with a network entity 105 using one or more OFEs. For example, a UE 115 may receive, from a network entity 105 via an OWC link, an optical wireless signal using one or more photodetectors of an OFE of the UE 115. The UE 115 may transmit, to the network entity 105 via an OWC, an optical wireless signal using one or more light sources of the UE 115 of an OFE of the UE 115.

Some OWC systems may operate in an optical spectrum between approximately $10^{11}$ and $10^{16}$ Hz. OWC may be envisioned to provide a relatively high data rate, such as 1 Tbps per link, because it may be difficult to support a 1 Tbps link using a range of RF (e.g., 100 GHz) spectrum. For instance, 1 Tbps communications may be targeted for 6G or 7G data rates.

Observations or measurements may demonstrate distortions resulting from device non-idealities (e.g., optical-to-electrical conversion nonlinearities or diode nonlinearities). For instance, frequency selective transmission side-originated distortions may include nonlinearities induced by electrical-to-optical conversions or a light source (e.g., LED or LD). In addition to transmission side-originated distortions, a photodetector (e.g., APD or SiPM) may introduce receive side-originated distortions.

Some optical channels may offer relatively little or no fading, while tending to increasingly attenuate signals with increasing frequency. The attenuation characteristic may be referred to as a "low-pass" characteristic, where signals in a relatively lower band may exhibit little or no attenuation, while some relatively higher-frequency signals may be increasingly attenuated as the frequency increases. In one example of a low-pass channel, in relatively lower frequency bands (e.g., in a 200 to 800 MHz range), a degradation of less than 2 dB per 100 MHz may occur. In some approaches, a TB over this range may meet some end-to-end performance targets. In higher frequency bands (e.g., 800 to 2000 MHz), a loss greater than 4 dB may occur per 100 MHz. Accordingly, a single TB transmission may not provide good performance in the range between 800 and 2000 MHz. For this range, subband based processing (e.g., subband MCS adaptation may be useful.

Subband processing in a low-pass OWC channel may be helpful to achieve performance targets. For instance, subband processing may be utilized for an entire bandwidth in a low-pass OWC channel. The subband processing may be utilized to achieve a relatively high data rate (e.g., a throughput greater than or equal to 1 Tbps) for uplink or downlink communications. In some aspects, a narrow beam optical link in OWC may enable SDM, where one or more (e.g., all) frequency domain resources may be reused per link in a multi-user system.

Some examples of the techniques described herein may provide communication performance improvements by utilizing frequency-dependent communication structures for OWC. For example, frequency-dependent constellation patterns may be utilized for a codeword. Utilizing frequency-dependent constellation patterns may contrast with some approaches that utilize one MCS per codeword. In some aspects, allocated frequency domain resources may be arranged into subbands with different MCSs. In some examples, an optical channel with relatively little or no fading may allow streamlining of channel state or control signaling (e.g., CSI or DCI signaling). For example, MCS patterns may be updated relatively less frequently.

An OWC channel frequency response may be a combination of a light source (e.g., LED or LD) frequency response, an optical wireless channel, and a photodetector frequency response. Light source and photodetector frequency responses may be relatively stable (e.g., may be static or may not change often).

Some examples of the techniques described herein may provide subband-based approaches, where different subbands may be utilized to carry different quantities of bits. In some aspects, different subbands may have different configurations, where the configurations may be based on an OFE of a device (e.g., a UE 115 or a network entity 105). In some approaches, transport blocks (TBs) may be utilized to transfer data traffic on a downlink, uplink, sidelink, or other link. In some cases, each TB may be encoded with a specific MCS level. A code rate across a TB may be fixed in some approaches. Due to the low pass nature of some OWC channels, a quantity of bits may vary per subband or a variable code rate (e.g., MCS) per subband may be utilized. Given the low-pass behavior of some OWC channels, some examples of the techniques described herein may address the low-pass behavior. Some of the subband-based approaches may be utilized in conjunction with bit allocation approaches as described herein.

Because an OWC channel may depend on one or more OFEs at one or more devices (e.g., a PA and LED or LD at a network entity 105 and a photodetector at a UE 115, or optical filters at a UE 115 or a network entity 105, among other examples), and the frequency response of OFE components may be relatively stable, a signaling mechanism may be utilized to indicate a channel frequency response for OWC (for a network entity 105 on a downlink or a UE 115 on an uplink, for instance). In some approaches, reference signals (e.g., a CSI-RS on a downlink or an SRS on an uplink) may be utilized to characterize a channel. Because an OWC channel may be relatively stable, transmission (e.g., frequent or repetitive transmission) of reference signals may be reduced or avoided. In some examples, information indicating one or more OFEs or one or more devices (e.g., light sources or photodetectors, among other examples) used as OFEs may be signaled on an uplink or downlink. The information may be utilized to determine or estimate the OWC channel (e.g., a profile of the OWC channel).

Figure 2:
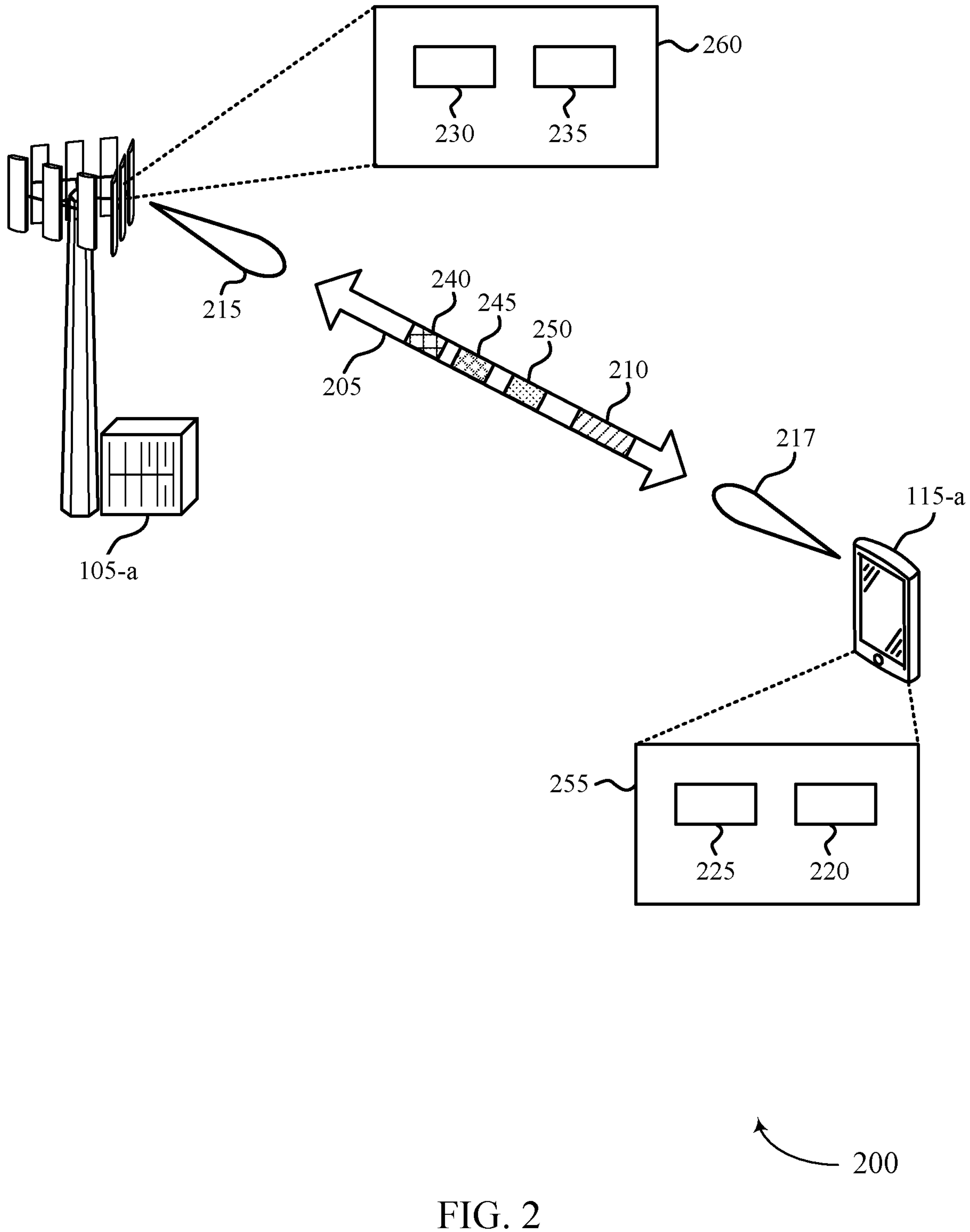
FIG. 2 shows an example of a wireless communications system that supports subband-based processing for optical channels in accordance with one or more aspects of the present disclosure.

FIG. 2 shows an example of a wireless communications system 200 that supports subband-based processing for optical channels in accordance with one or more aspects of the present disclosure. In some examples, aspects of the wireless communications system 200 may implement or be implemented by aspects of the wireless communications system 100. For example, the wireless communications system 200 may include a UE 115-*a* and a network entity 105-*a*, which may be examples of the corresponding devices as described herein, including with reference to FIG. 1.

In some wireless communication systems, a UE 115-*a* and a network entity 105-*a* may communicate information via one or more optical signals (e.g., variations in light intensity) in an optical band or via one or more electromagnetic signals (e.g., variations in voltage) in an RF band. For example, the UE 115-*a* and the network entity 105-*a* may communicate information using optical signals in a frequency band of (approximately) $10^{11}$ to $10^{16}$ Hz, such as in the infrared to ultraviolet spectrum. Additionally, or alternatively, the UE 115-*a* and the network entity 105-*a* may communicate information using electromagnetic signals in a frequency band of (approximately) $10^{1}$ to $10^{12}$ Hz.

In some examples, the UE 115-*a* and the network entity 105-*a* may support OWC. For example, the UE 115-*a* and the network entity 105-*a* may transmit optical signals, such as beams of light, via an OWC link 205. The OWC link 205 may be an example of a communication link 125 via which optical signals may be communicated. In some examples, the network entity 105-*a* and the UE 115-*a* may communicate using optical beams. For example, the network entity 105-*a* may communicate using one or more first optical beams 215 or the UE 115-*a* may communicate using one or more second optical beams 217. As used herein, the term "communication" and variations thereof may denote transmission, reception, or a combination thereof. For example, the UE 115-*a* may communicate by transmitting a signal to the network entity 105-*a*, may communicate by receiving a signal from the network entity 105-*a*, or a combination of both.

In some optical wireless communication systems, the network entity 105-*a* may transmit one or more optical signals to the UE 115-*a* or may receive one or more optical signals from the UE 115-*a* using a first OFE 260. The first OFE 260 may include a first light source 230 for transmitting optical signals or a first photodetector 235 for receiving optical signals. For example, the first light source 230 may include an LED or LD used to form the one or more first optical beams 215. In some aspects, the first OFE 260 may include one or more other components, such as one or more lenses (e.g., one or more condenser lenses or collimating lenses, among other examples), one or more mirrors, or one or more power amplifiers. In some examples, the first photodetector 235 may be an APD or SiPM. For instance, the first photodetector 235 may include an array of SiPMs, which may increase a gain of a received optical signal.

In some optical wireless communication systems, the UE 115-*a* may transmit one or more optical signals to the network entity 105-*a* or may receive one or more optical signals from the network entity 105-*a* using a second OFE 255. The second OFE 255 may include a second light source 220 for transmitting optical signals or a second photodetector 225 for receiving optical signals. For example, the second light source 220 may include an LED or LD used to form the one or more second optical beams 217. In some aspects, the second OFE 255 may include one or more other components, such as one or more lenses (e.g., one or more condenser lenses or collimating lenses, among other examples), one or more mirrors, or one or more power amplifiers. In some examples, the second photodetector 225 may be an APD or SiPM. For instance, the second photodetector 225 may include an array of SiPMs, which may increase a gain of a received optical signal.

In some examples, the UE 115-*a* may communicate, with the network entity 105-*a*, a first indication 240 of an OFE and a second indication 245 of an operating point for communicating optical signaling via an optical channel with the network entity 105-*a*. The first indication 240 and the second indication 245 may be communicated together or separately. In some examples, the first indication 240 and the second indication 245 may be communicated in the same direction or in different directions. The first indication 240 may indicate a type, model, operating characteristic (e.g., frequency range, optical beam width, among other examples), or other parameter(s) corresponding to an OFE (e.g., corresponding to one or more light sources, photodetectors, or characteristics thereof), or any combination thereof. In some scenarios, the OFE (e.g., the first OFE 260) or the operating point may correspond to the network entity 105-*a*, and the optical channel may be a downlink optical channel. In some scenarios, the OFE (e.g., the second OFE 255) or the operating point may correspond to the UE 115-*a*, and the optical channel may be an uplink optical channel.

In some examples, the UE 115-*a* may communicate the first indication 240 by transmitting the first indication 240 to the network entity 105-*a*. In these examples, the first indication 240 may correspond to the second OFE 255 (e.g., the second light source 220 or the second photodetector 225). For instance, the UE 115-*a* may transmit the first indication 240 to the network entity 105-*a* (e.g., gNB), where the first indication 240 indicates a type of the second OFE 255 (e.g., the second light source 220 for uplink signaling or the second photodetector 225 for downlink reception) for transmitting or receiving optical signals. In some approaches, the UE 115-*a* may signal a type of the second OFE 255 (e.g., a type or model of the second light source 220 or the second photodetector 225) to the network entity 105-*a*. For instance, the first indication 240 may be communicated via a control channel (e.g., physical uplink control channel (PUCCH)). In some aspects, the UE 115-*a* or the network entity 105-*a* may store a structure (e.g., table, array, database, list, or tree, among other examples) of OFEs. The first indication 240 may indicate an index or value of the structure to indicate the OFE. For instance, the UE 115-*a* may signal an index of the second OFE 255 to the network entity 105-*a* (via a control channel, for example). The network entity 105-*a* may utilize the first indication 240 to characterize the downlink channel or the uplink channel (e.g., to determine one or more channel characteristics, such as frequency range, attenuation over frequency, or gain, among other examples).

In some examples, the UE 115-*a* may communicate the first indication 240 by receiving the first indication 240 from the network entity 105-*a*. One or more of the approaches described may be utilized for the network entity 105-*a* to signal one or more OFE parameters to the UE 115-*a*. In these examples, the first indication 240 may correspond to the first OFE 260 (e.g., the first light source 230 or the first photodetector 235). For instance, the network entity 105-*a* may transmit the first indication 240 to the UE 115-*a*, where the first indication 240 indicates a type of the first OFE 260 (e.g., the first light source 230 for downlink signaling or the first photodetector 235 for uplink reception) for transmitting or receiving optical signals. In some approaches, the network entity 105-*a* may signal a type of the first OFE 260 (e.g., a type or model of the first light source 230 or first photodetector 235) to the network entity 105-*a*. For instance, the first indication 240 may be communicated via a control channel (e.g., physical downlink control channel (PDCCH)). In some aspects, the UE 115-*a* or the network entity 105-*a* may store a structure (e.g., table, array, database, list, or tree, among other examples) of OFEs. The first indication 240 may indicate an index or value of the structure to indicate the OFE. For instance, the network entity 105-*a* may signal an index of the first OFE 260 to the UE 115-*a* (via a control channel, for example). The UE 115-*a* may utilize the first indication 240 to characterize the downlink channel or the uplink channel (e.g., to determine one or more channel characteristics, such as frequency range, attenuation over frequency, or gain, among other examples).

The second indication 245 may indicate an operating point. An operating point may be a bias or value to produce a real-valued optical signal. For example, optical channel gains are real-valued. This may contrast with an electromagnetic channel, where channel gains may be complex-valued. The operating point may enable signals to be shifted into the real domain to avoid complex values for optical signaling.

In some examples, the UE 115-*a* may communicate the second indication 245 by transmitting the second indication 245 to the network entity 105-*a*. In these examples, the second indication 245 may correspond to the operating point of the UE 115-*a* (e.g., the second light source 220 of the second OFE 255). For instance, the UE 115-*a* may transmit the second indication 245 to the network entity 105-*a*, where the second indication 245 indicates an operating point for optical signaling transmitted from the UE 115-*a*. In some examples, the second indication 245 may be communicated via a control channel (e.g., PUCCH). In some aspects, the UE 115-*a* or the network entity 105-*a* may store a structure (e.g., table, array, database, list, or tree, among other examples) of operating points. The second indication 245 may indicate an index or value of the structure to indicate the operating point. For instance, the UE 115-*a* may signal an index of the operating point to the network entity 105-*a* (via a control channel, for example). The network entity 105-*a* may utilize the second indication 245 to determine (e.g., look up) the operating point.

In some examples, the network entity 105-*a* may communicate the second indication 245 by transmitting the second indication 245 to the UE 115-*a*. In these examples, the second indication 245 may correspond to the operating point of the network entity 105-*a* (e.g., the first light source 230 of the first OFE 260). For instance, the network entity 105-*a* may transmit the second indication 245 to the UE 115-*a*, where the second indication 245 indicates an operating point for optical signaling transmitted from the network entity 105-*a*. In some examples, the second indication 245 may be communicated via a control channel (e.g., PDCCH). In some aspects, the UE 115-*a* or the network entity 105-*a* may store a structure (e.g., table, array, database, list, or tree, among other examples) of operating points. The second indication 245 may indicate an index or value of the structure to indicate the operating point. For instance, the network entity 105-*a* may signal an index of the operating point to the UE 115-*a* (via a control channel, for example). The UE 115-*a* may utilize the second indication 245 to determine (e.g., look up) the operating point.

In some examples, the first indication 240 or the second indication 245 may be communicated using one or more electromagnetic signals via an RF channel in addition to, or alternatively from, being communicated using one or more optical signals via an optical channel. For instance, the first indication 240 or the second indication 245 may be communicated before the OWC link 205 is established, after the OWC link 205 is established, or both.

In some approaches, the network entity 105-*a* or the UE 115-*a* may determine (e.g., calculate, compute, estimate) a channel or channel characteristic(s) of the optical channel based on the first indication 240 or the second indication 245. For instance, the network entity 105-*a* or the UE 115-*a* may determine a channel profile or channel gain (e.g., a frequency response) over a frequency range based on the first indication 240 or the second indication 245. In some examples, the network entity 105-*a* or the UE 115-*a* may combine information based on the received first indication 240 or second indication 245 with local information to determine the channel. For instance, the network entity 105-*a* may utilize information about the second photodetector 225 of the second OFE 255 from the first indication 240 in combination with local information about the first light source 230 of the first OFE 260 to determine the channel profile or channel gain of a downlink optical channel. In another example, the UE 115-*a* may utilize information about the first photodetector 235 of the first OFE 260 from the first indication 240 in combination with local information about the second light source 220 of the second OFE 255 to determine the channel profile or channel gain of an uplink optical channel.

As described herein, the optical channel may vary (e.g., increasingly attenuate) with increasing frequency. An example of an optical channel gain or frequency response is given with reference to FIG. 3. To address the gain variance of the optical channel, multiple optical subbands associated with the optical channel may be configured. Configuring multiple optical subbands may allow one or more characteristics (e.g., quantity of subbands, frequency widths, MCSs, modulation orders, TB distribution, MIMO layers, or quantities of bits, among other examples) to be the same or vary between optical subbands. Allowing different characteristics may allow enhanced communication performance (e.g., data rates) or communication structure flexibility.

In some examples, the network entity 105-*a* of the UE 115-*a* may determine (e.g., configure, set-up, send a signal to request, or select) one or more characteristics for optical subbands for OWC. For example, the network entity 105-*a* or the UE 115-*a* may determine a configuration for the channel based on the first indication 240 or the second indication 245. In some aspects, the network entity 105-*a* or the UE 115-*a* may determine one or more characteristics (e.g., parameters) of the configuration based on the channel corresponding to the OFE and the operating point. For instance, the network entity 105-*a* or the UE 115-*a* may determine a quantity of subbands, frequency width(s), MCS (s), modulation order(s), TB distribution, MIMO layer(s), or bit allocation(s), among other examples, for the channel (e.g., channel gain). Accordingly, some examples of the techniques described herein may provide for flexible subband configuration or signaling of related parameters for the subbands.

In some aspects, the network entity 105-*a* or the UE 115-*a* may perform subband bit allocation (e.g., bit loading) for optical subbands associated with the optical channel. For instance, a different quantity of bits may be allocated to different subbands depending on the channel gains experienced by that subband. As described herein, channel gains may be real-valued in OWC channels, and the transmitted waveform may be real-valued and non-negative. Some optical waveforms may communicate via variations in light intensity. One example of a waveform for OWC is a direct current (DC)-bias optical OFDM (DCO-OFDM). The non-negativity condition may be satisfied by setting the waveform based on the operating point (e.g., by adding a DC bias to the waveform). The real-value condition may be satisfied by up-conversion to an intermediate frequency (IF) center frequency (e.g., 50 MHz). With DCO-OFDM, bit allocation (e.g., bit loading) for N subbands may be performed in accordance with $$R_k = \frac{1}{N}\left[R_T + \sum_{i=1, i\neq k}^{N} \log_2\left(\frac{\sigma_i^2}{H_i}\right) - N\log_2\left(\frac{\sigma_k^2}{H_k}\right)\right],$$

where $R_k$ is a quantity of bits for subband k, $R_T$ is a total quantity of bits for a given OFDM symbol, and $$\{H_k\}_{k=1}^{N}$$

are channel gains per subband. If $R_k$ for subband k is negative, subband k may be excluded (and calculations may be performed again, for example). If noise is white, then $$\sigma_i^2 = \sigma^2,$$

∀i and bit allocation may be performed without the noise variance (e.g., without a measure, estimate, or value for the noise variance). Since $R_k$ are real-valued, $R_k$ may be quantized into quadrature amplitude modulation (QAM) sizes. This approach for bit loading may increase (e.g., maximize) signal-to-noise ratio (SNR) (with a condition that SNR is constant for optical subbands in some approaches, for example).

In some aspects, bit allocation (e.g., loading) may differ for an optical channel relative to an electromagnetic (e.g., RF) channel. OWC channel gains may be real-valued (e.g., not complex-valued). In some approaches, after bit allocation is performed, a device (e.g., the network entity 105-*a* or the UE 115-*a*) may check to ensure that the operating point (e.g., DC bias) results in a non-negative waveform. If the waveform includes one or more negative portions, the device (e.g., the network entity 105-*a* or the UE 115-*a*) may adjust the operating point or may negotiate for (e.g., send a signal to request) a change in the operating point. In an electromagnetic channel, no non-negativity constraint may be checked or enforced.

In some examples, the network entity 105-*a* or the UE 115-*a* may determine one or more aspects of the configuration based on the bit allocation approach described herein. For instance, with a DCO-OFDM waveform, each subband may span one or more subcarriers. The configuration for each subband (e.g., frequency width of each subband or relative location of each subband in a resource (e.g., a resource block (RB) grid), among other examples) may depend on the first indication 240 and the second indication 245 (e.g., UE 115-*a* parameters or network entity 105-*a* parameters).

The UE 115-*a* may communicate, with the network entity 105-*a*, information 250 indicating the configuration of one or more optical subbands associated with the optical channel. As described herein, the one or more optical subbands may be based on the OFE and the operating point (e.g., the channel ascertained based on the OFE and the operating point). In some examples, the information 250 may indicate a quantity of subbands, frequency width(s), MCS(s), modulation order(s), TB distribution, MIMO layer(s), or bit allocation(s), among other examples. In some examples, the information 250 indicating the configuration of one or more subbands may be signaled via a downlink to the UE 115-*a* or via an uplink to the network entity 105-*a* via DCI, a medium access control-control element (MAC-CE), or RRC signaling.

In some approaches, the configuration of one or more subbands may differ from a configuration for a component carrier (CC) or carrier aggregation (CA) because the configuration for one or more subbands for OWC may be specific to the network entity 105-*a* or the UE 115-*a* (instead of being specific to a cell). For instance, different UEs may have different subband configurations, whereas a CC or CA configuration may apply to all UEs in a cell.

In some examples, the UE 115-*a* may communicate the information 250 by transmitting the information 250 to the network entity 105-*a*. In these examples, the information 250 may correspond to the configuration of the one or more optical subbands for the UE 115-*a* (e.g., for the second OFE 255). For instance, the UE 115-*a* may transmit the information 250 to the network entity 105-*a*, where the information 250 indicates one or more characteristics of subbands for communication with the UE 115-*a*. In some examples, the information 250 may be communicated via a control channel (e.g., PUCCH). In some aspects, the UE 115-*a* or the network entity 105-*a* may store a structure (e.g., table, array, database, list, or tree, among other examples) of configurations. The information 250 may indicate an index or value of the structure to indicate the configuration. For instance, the UE 115-*a* may signal an index of the configuration to the network entity 105-*a* (via a control channel, for example). The network entity 105-*a* may utilize the information 250 to determine (e.g., look up) the configuration.

In some examples, the network entity 105-*a* may communicate the information 250 by transmitting the information 250 to the UE 115-*a*. In these examples, the information 250 may correspond to the configuration of the one or more optical subbands for the network entity 105-*a* (e.g., for the first OFE 260). For instance, the network entity 105-*a* may transmit the information 250 to the UE 115-*a*, where the information 250 indicates one or more characteristics of subbands for communication with the network entity 105-*a*. In some examples, the information 250 may be communicated via a control channel (e.g., PUCCH). In some aspects, the network entity 105-*a* or the UE 115-*a* may store a structure (e.g., table, array, database, list, or tree, among other examples) of configurations. The information 250 may indicate an index or value of the structure to indicate the configuration. For instance, the network entity 105-*a* may signal an index of the configuration to the UE 115-*a* (via a control channel, for example). The UE 115-*a* may utilize the information 250 to determine (e.g., look up) the configuration.

In some examples, communicating the information 250 may include communicating an indication of a frequency range and an indication of a location in an RB for at least one of the one or more optical subbands associated with the optical channel. For instance, the information 250 may indicate a frequency range Additionally, or alternatively, communicating the information 250 indicating the configuration may include communicating an indication of a quantity of the one or more optical subbands associated with the optical channel. Additionally, or alternatively, communicating the information 250 indicating the configuration may include communicating an indication of a first frequency (e.g., a starting or beginning frequency) and a second frequency (e.g., an ending frequency) for at least one of the one or more optical subbands associated with the optical channel.

In some cases, downlink OWC channel behavior may be different from uplink OWC channel due to the operating point (e.g., DC bias), which may affect the LED or LD frequency response or the photodetector frequency response. For instance, a downlink channel and an uplink channel may not be symmetric.

In some aspects, the configuration regarding the subbands (e.g., quantity of subbands, start and end of each subband, relative location of each subband in an RB grid, among other examples) may be selected for the downlink or uplink. The configuration may be based on the first indication 240 or the second indication 245 (e.g., network entity 105-*a* parameter (s) corresponding to the first OFE 260 or UE 115-*a* parameter(s) corresponding to the second OFE 255). In some cases, subband parameters may depend on transmission direction. For instance, subband parameters may be different for a downlink than for an uplink (e.g., parameters on a downlink may be configured differently from subband parameters on an uplink).

In some examples, the UE 115-*a* and the network entity 105-*a* may both communicate one or more indications or information corresponding to an uplink channel and a downlink channel. For instance, the UE 115-*a* may communicate the first indication 240 of the first OFE 260, communicate the second indication 245, and communicate the information 250 corresponding to a downlink channel. Additionally, or alternatively, the UE 115-*a* may also communicate (e.g., receive) a third indication of the second OFE 255 corresponding to the UE 115-*a*, and may communicate a fourth indication of a second operating point for communicating second optical signaling via an uplink optical channel with the network entity 105-*a*. The UE 115-*a* may also communicate, with the network entity 105-*a*, information indicating a second configuration of one or more second optical subbands associated with the uplink optical channel. The one or more second optical subbands may be based on the second OFE 255 and the second operating point. The UE 115-*a* may also communicate, with the network entity 105-*a*, one or more second optical signals via the uplink optical channel based at least in part on the second configuration of the one or more second optical subbands.

In some approaches for electromagnetic signaling, up to a 2 TB transmission may be utilized (e.g., a 1 TB transmission with up to 4-layer MIMO, and 2 TB with 5-to-8-layer MIMO). In these approaches, each TB is encoded with a specific MCS level, and the code rate across the TB may be fixed. With a fixed MCS, a TB size calculation and a TB acknowledgment or negative acknowledgment (ACK/NACK) procedure may be relatively straightforward.

For optical channels (e.g., due to the low-pass nature of OWC channels), subband processing may be utilized, where different quantities of bits may be utilized per subband and variable code rates (e.g., variable MCSs) per subband may be utilized. In some examples, each TB may be configured with one MCS, and a multiple TB transmission per transmission time interval (TTI) may be utilized.

In some approaches, the UE 115-*a* may communicate, with the network entity 105-*a*, second information (with the information 250 or separately from the information 250, for example) indicating a second configuration of one or more TBs for communication via the optical channel. On a downlink, for instance, the network entity 105-*a* may configure support for a multi-TB transmission (which may be supported even with a 1-layer transmission for optical signaling). Additionally, or alternatively, on an uplink, the UE 115-*a* may configure support for a multi-TB transmission (which may be supported even with a 1-layer transmission for optical signaling). In some examples, each TB may be mapped (with a fixed MCS, for instance) to a subband or a group of subbands.

In some examples, communicating the second information may include communicating an indication of a mapping between the one or more TBs and the one or more optical subbands. Each TB may be associated with at least one of the one or more optical subbands. For instance, on a downlink, the network entity 105-*a* may indicate a mapping from TBs to subbands. The network entity 105-*a* may signal the second information about the mapping to the UE 115-*a* using RRC, MAC-CE, or DCI signaling. Additionally, or alternatively, on an uplink, the UE 115-*a* may indicate a mapping from TBs to subbands, which may be signaled using RRC, MAC-CE, or uplink control information (UCI) signaling.

In some aspects, communicating the second information may include communicating an indication of a first MCS associated with a first TB and a first optical subband, and an indication of a second MCS associated with a second TB and a second optical subband. For example, the network entity 105-*a* may configure each TB with an MCS level depending on an OWC channel gain (e.g., average OWC channel gain) corresponding to a subband. The network entity 105-*a* may signal the MCS level for each subband to the UE 115-*a* using RRC, MAC-CE, or DCI signaling. Additionally, or alternatively, the UE 115-*a* may configure each TB with an MCS level depending on an average OWC channel gain corresponding to a subband. The UE 115-*a* may signal the MCS level for each subband to the network entity 105-*a* using RRC, MAC-CE, or UCI signaling.

In some aspects, the second MCS associated with the second TB may be indicated relative to the first MCS associated with the first TB. Because OWC may exhibit low-pass behavior, for instance, an MCS mapping for each TB and subband may be performed in a relative manner. In one example, TB #1 may be mapped to subband #1 with a highest channel gain (where subband #1 may be configured with a highest MCS), while TB #2 on subband #2 may be configured with a MCS that is a quantity (e.g., X) lower than the MCS for subband #1. In another example, the network entity 105-*a* may signal a highest MCS on TB #1 and may signal the "X" level MCS difference for one or more subsequent subbands. Using differential signaling may help to reduce an amount of overhead utilized to indicate the multiple MCSs.

In some examples, the UE 115-*a* may communicate an indication of a mapping of a first modulation order to a first optical subband of the one or more optical subbands. The network entity 105-*a* may signal the mapping of the modulation order to one or more subbands to the UE 115-*a* using RRC, MAC-CE, or DCI signaling. For instance, on a downlink, the network entity 105-*a* may perform a transmission of one TB with different modulation orders on different subbands. Additionally, or alternatively, the UE 115-*a* may signal the mapping of the modulation order to one or more subbands to the network entity 105-*a* using RRC, MAC-CE, or UCI signaling. On an uplink, for instance, the UE 115-*a* may perform a transmission of one TB with different modulation orders on different subbands.

In some aspects, a second modulation order corresponding to a second subband may be indicated relative to the first modulation order corresponding to a first subband. Because OWC may exhibit low-pass behavior, for instance, a modulation order mapping to one or more subbands may be performed in a relative manner. In one example, modulation order #1 may be mapped to subband #1 with a highest channel gain (where subband #1 may be configured with a highest modulation order), while modulation order #2 on subband #2 may be configured with a modulation order that is a quantity (e.g., X) lower than the modulation order for subband #1. In another example, the network entity 105-*a* may signal a highest modulation order on TB #1 and may signal the "X" level modulation order difference for one or more subsequent subbands. Using differential signaling may help to reduce an amount of overhead utilized to indicate the multiple modulation orders.

With a single-TB transmission with various modulation orders for different subbands, a calculation of TB size may not be straightforward. In some approaches with electromagnetic signaling, TB size may be determined based on a quantity of layers, a modulation order, a code rate, a quantity of RBs in the frequency domain, a duration of a transmission, or demodulation reference signal (DMRS) overhead, among other examples. Some of the techniques described herein may provide an approach for calculating the TB size based on the mapping of different modulation orders to different subbands. For example, a size of a first TB may be based on a quantity of RBs associated with a first optical subband. In some approaches, to determine a TB size, the network entity 105-*a* or the UE 115-*a* may follow a rule where N subbands are configured and each subband is assigned a specific modulation order, where the size of each subband (in terms of bits, for instance) may be inferred based on a quantity of RBs in that subband or duration, for example. The network entity 105-*a* or UE 115-*a* may then sum up the size within each subband to determine (e.g., calculate) the TB size.

In some examples, the UE 115-*a* may communicate, with the network entity 105-*a*, one or more optical signals 210 (e.g., TB(s)) via the optical channel based on the configuration of the one or more optical subbands. For instance, the UE 115-*a* may transmit or receive the one or more optical signals 210 based on the quantity of subbands, frequency width(s), MCS(s), modulation order(s), TB distribution, MIMO layer(s), or bit allocation(s), among other examples.

In some aspects, depending on a UE 115-*a* capability or due to one or more complexity constraints, one or more TBs may be utilized for transmission over a TTI. For downlink or uplink, for example, a transmission of one or more TBs (e.g., 2 TBs) may be performed, where one TB may be mapped to a group of subbands with different modulation orders corresponding to different subbands within the group, and another TB may be mapped to another group of subbands with various modulation orders corresponding to different subbands. In some approaches, for each TB, a code rate may be fixed, whereas modulation orders may vary depending on the subbands. For example, the network entity 105-*a* may output, or the UE 115-*a* may receive, a first TB corresponding to a first optical subband with a first modulation order and a second optical subband with a second modulation order. The network entity 105-*a* may further output, or the UE 115-*a* may receive, a second TB corresponding to a third optical subband with a third modulation order and a fourth optical subband with a fourth modulation order.

In some aspects, depending on UE 115-*a* capability, each subband (or a group of subbands) may be configured with a MIMO layer and thus different TBs may be transmitted via different MIMO layers. Two or more (e.g., each of the) subbands may have a different associated MIMO precoding matrix. For example, the network entity 105-*a* may output, or the UE 115-*a* may receive, a first TB corresponding to a first optical subband via a first layer. The network entity 105-*a* may also output, or the UE 115-*a* may also receive, a second TB corresponding to a second optical subband via a second layer. On a downlink, for instance, after mapping the TBs to subbands, the network entity 105-*a* may transmit each TB with a different MIMO layer depending on channel conditions on the corresponding subbands. In some examples, the network entity 105-*a* may signal a MIMO precoding matrix or a quantity of MIMO layers per TB via RRC, MAC-CE, or DCI signaling.

In some examples, the network entity 105-*a* or the UE 115-*a* may perform one or more handshaking procedures. The communication overhead for the handshaking procedures in OWC may be relatively small or reduced for relatively stable (e.g., static) OWC channels. In some approaches, a semi-static (e.g., using MAC-CE signaling) or a static (e.g., using RRC signaling) may be performed for a portion or all of the handshaking procedures.

In some examples, the UE 115-*a* may transmit, or the network entity 105-*a* may obtain, an ACK or NACK of a first TB with one or more modulation orders associated with at least one of the one or more optical subbands. For instance, an ACK/NACK procedure for a TB with different modulation orders for different subbands may be performed. In some approaches, the network entity 105-*a* may perform a retransmission of an entire TB. In some approaches, ACK/NACK processing per subband or group of subbands may be performed (e.g., an ACK or NACK may be communicated for each subband independently).

Figure 3:
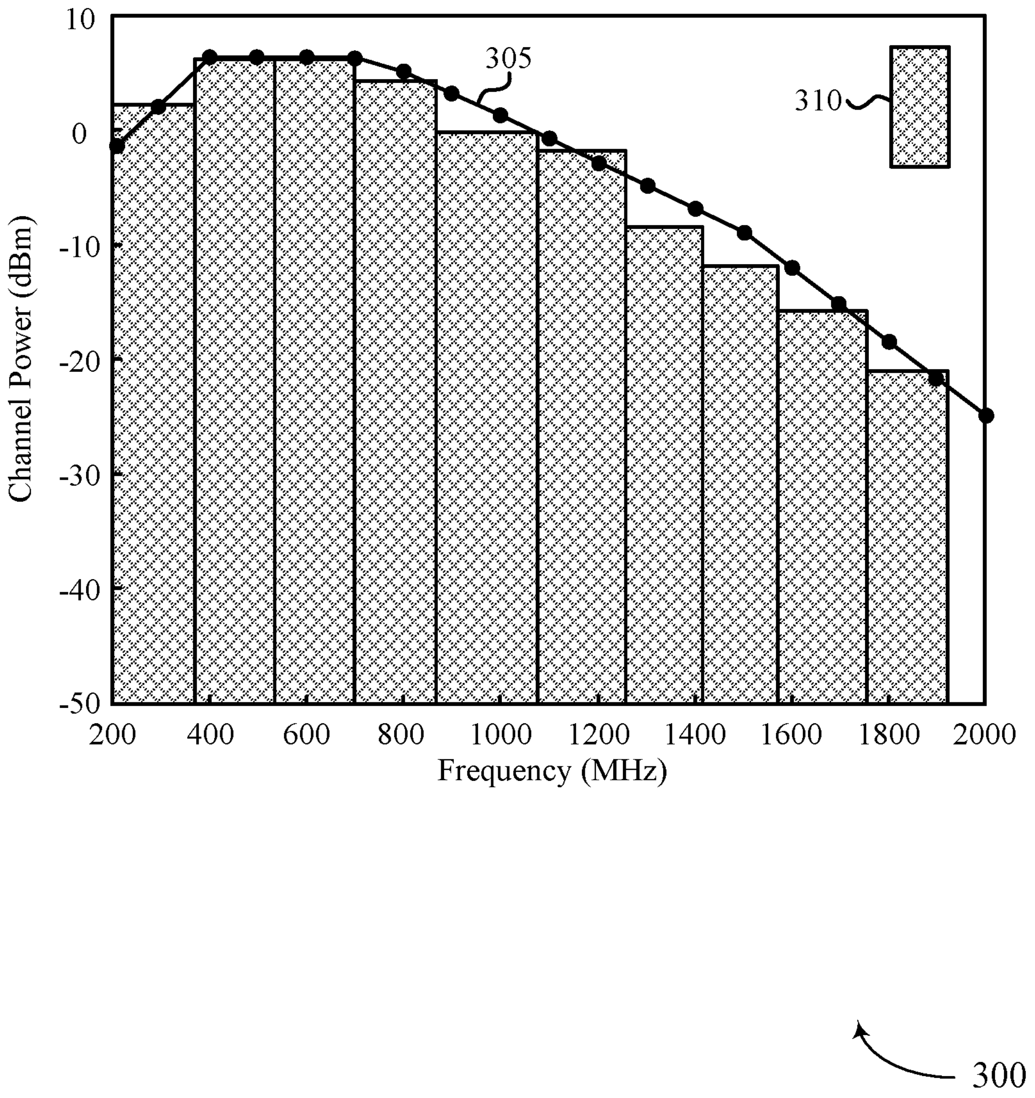
FIG. 3 shows an example of a graph that supports subband-based processing for optical channels in accordance with one or more aspects of the present disclosure.

FIG. 3 shows an example of a graph 300 that supports subband-based processing for optical channels in accordance with one or more aspects of the present disclosure. In some approaches, the network entity 105-*a* or the UE 115-*a* may determine a channel or channel characteristic(s) (e.g., channel gain or frequency response) for an uplink channel or a downlink channel as described with reference to FIG. 2. As illustrated by the example of FIG. 3, the optical channel 305 (e.g., low-pass OWC channel) may attenuate with increasing frequency. For instance, the optical channel gain is expressed in decibel milliwatts (dBm) over frequency in MHz in FIG. 3. In relatively lower frequency bands (e.g., in a 200 to 800 MHz range), a degradation of less than 2 decibels (dB) per 100 MHz may occur. In higher frequency bands (e.g., 800 to 2000 MHz), a loss greater than 4 dB may occur per 100 MHz.

In accordance with some of the techniques described herein, a network entity 105-*a* or UE 115-*a* may determine one or more optical subbands for communication based on an optical channel or channel characteristic(s). For instance, a network entity 105-*a* or UE 115-*a* may determine the optical subbands 310 based on the optical channel 305. As illustrated in FIG. 3, different optical subbands 310 may have or occupy different frequency ranges or may have differing widths. In some examples, two or more of the optical subbands 310 may have (e.g., be utilized to carry) different quantities of bits or may have different transmission powers.

Figure 4:
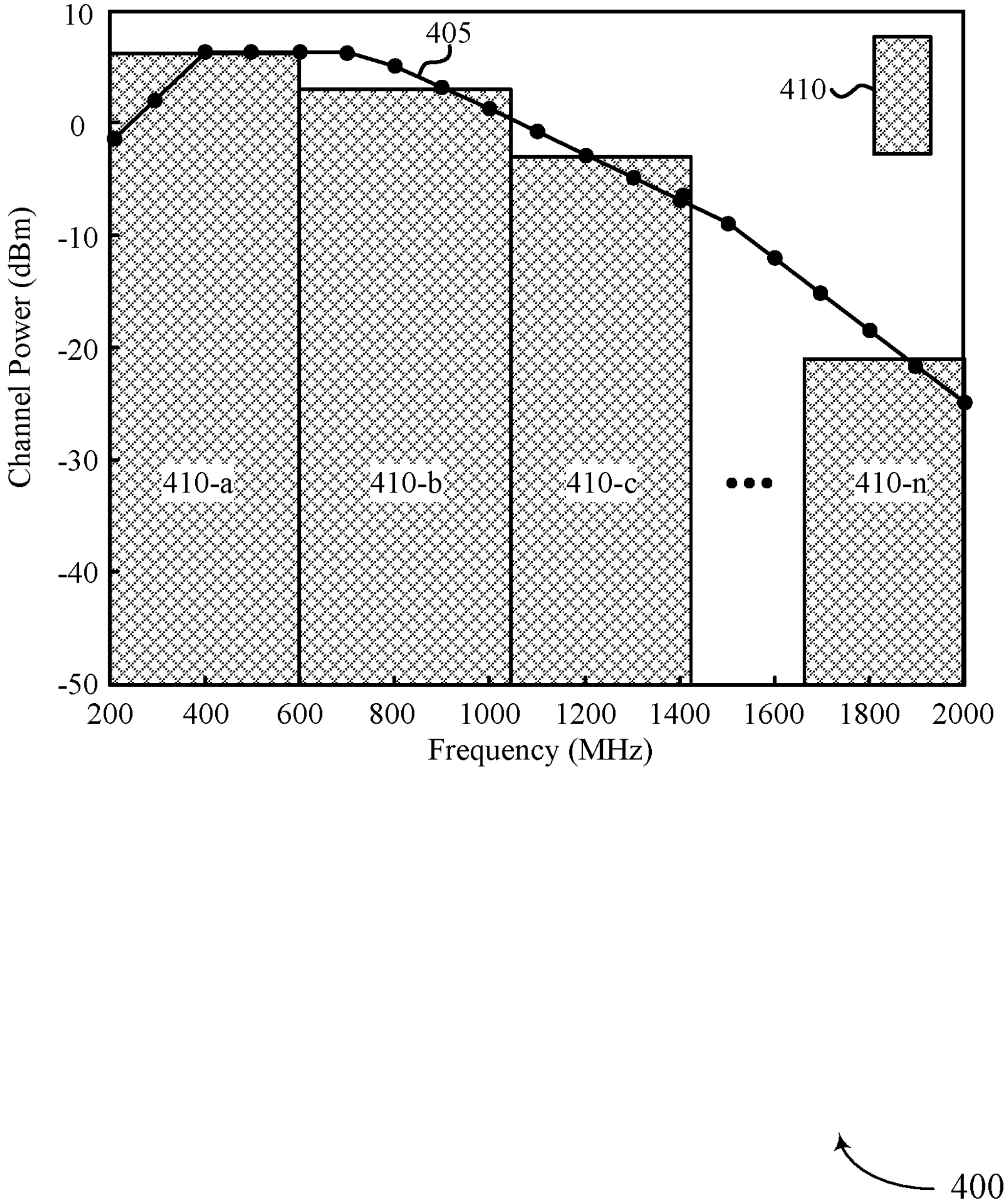
FIG. 4 shows an example of a graph that supports subband-based processing for optical channels in accordance with one or more aspects of the present disclosure.

FIG. 4 shows an example of a graph 400 that supports subband-based processing for optical channels in accordance with one or more aspects of the present disclosure. In some approaches, the network entity 105-*a* or the UE 115-*a* may determine a channel or channel characteristic(s) (e.g., channel gain or frequency response) for an uplink channel or a downlink channel as described with reference to FIG. 2. As illustrated by the example of FIG. 4, the optical channel 405 (e.g., low-pass OWC channel) may attenuate with increasing frequency. For instance, the optical channel gain is expressed in dBm over frequency in MHz in FIG. 4. In relatively lower frequency bands (e.g., in a 200 to 800 MHz range), a degradation of less than 2 decibels (dB) per 100 MHz may occur. In higher frequency bands (e.g., 800 to 2000 MHz), a loss greater than 4 dB may occur per 100 MHZ.

In accordance with some of the techniques described herein, a network entity 105-*a* or UE 115-*a* may determine, configure, or communicate a configuration indicating one or more parameters for one or more optical subbands for communication based on an optical channel or channel characteristic(s). For instance, a network entity 105-*a* or UE 115-*a* may determine a quantity of optical subbands, frequency widths, MCSs, modulation orders, TB distribution, MIMO layers, or quantities of bits, among other examples. In some approaches, one or more of the techniques described with reference to FIG. 2 may be utilized to determine, configure, or communicate a configuration. A configuration of one or more optical subbands may be communicated between the network entity 105-*a* and the UE 115-*a*, or one or more optical subbands may be utilized to communicate one or more optical signals in accordance with the configuration. In FIG. 4, a first subband 410-*a*, a second subband 410-*b*, a third subband 410-*c*, and an nth subband 410-*n* are illustrated to describe various examples in accordance with some of the techniques described herein.

In some examples, a network entity 105-*a* or UE 115-*a* may determine or communicate a configuration of a quantity of optical subbands. For instance, a network entity 105-*a* or UE 115-*a* may determine N optical subbands 410 or may communicate a configuration indicating N optical subbands 410.

In some examples, a network entity 105-*a* or UE 115-*a* may determine or communicate a configuration of a frequency width for one or more of the optical subbands 410. For instance, a network entity 105-*a* or UE 115-*a* may determine or communicate a configuration indicating 400 MHz for the first subband 410-*a*, 450 MHz for the second subband 410-*b*, and so on for the optical subbands 410.

In some examples, a network entity 105-*a* or UE 115-*a* may determine or communicate a configuration of beginning or ending frequencies for one or more of the optical subbands 410. For instance, a network entity 105-*a* or UE 115-*a* may determine or communicate a configuration indicating 200 MHz as a beginning frequency or 600 MHz for an ending frequency of the first subband 410-*a*, and so on for the optical subbands 410.

In some examples, a network entity 105-*a* or UE 115-*a* may determine or communicate a configuration of a location (e.g., index) of an RB for one or more of the optical subbands 410. For instance, a network entity 105-*a* or UE 115-*a* may determine or communicate a configuration indicating a first RB for the first subband 410-*a*, a second RB for the second subband 410-*b*, and so on for the optical subbands 410.

In some examples, a network entity 105-*a* or UE 115-*a* may determine or communicate a configuration of one or more TBs (e.g., TB mapping(s)) for one or more of the optical subbands 410. For instance, a network entity 105-*a* or UE 115-*a* may determine or communicate a configuration indicating a first TB for the first subband 410-*a*, a second TB for the second subband 410-*b*, a third TB for the third subband 410-*c*, and so on for the optical subbands 410.

In some examples, a network entity 105-*a* or UE 115-*a* may determine or communicate a configuration of one or more MCSs for one or more of the optical subbands 410. For instance, a network entity 105-*a* or UE 115-*a* may determine or communicate a configuration indicating a first MCS for the first subband 410-*a*, a second MCS for the second subband 410-*b*, a third MCS for the third subband 410-*c*, and so on for the optical subbands 410. In some examples, each MCS may correspond to a respective TB.

In some examples, a network entity 105-*a* or UE 115-*a* may determine or communicate a configuration of one or more modulation orders for one or more of the optical subbands 410. For instance, a network entity 105-*a* or UE 115-*a* may determine or communicate a configuration indicating a first modulation order for the first subband 410-*a*, a second modulation order for the second subband 410-*b*, a third modulation order for the third subband 410-*c*, and so on for the optical subbands 410. In some examples, one TB may be utilized for one or more of the optical subbands 410, where different modulation orders may be utilized for at least two of the optical subbands. A transport block size may be determined as described with reference to FIG. 2 in some aspects.

In some examples, a network entity 105-*a* or UE 115-*a* may determine or communicate a configuration of one or more individual TBs or one or more groups of TBs for one or more of the optical subbands 410. For instance, a network entity 105-*a* or UE 115-*a* may determine or communicate a configuration indicating a first TB for the first subband 410-*a* and the second subband 410-*b*, and a second TB for the third subband 410-*c* and the nth subband 410-*n*. The network entity 105-*a* or the UE 115-*a* may determine or communicate a configuration of one or more code rates. For instance, the first TB may have a code rate of C, and the second TB may have a code rate of C/2. In some aspects, a first modulation order may be utilized for the first subband 410-*a*, a second modulation order may be utilized for the second subband 410-*b*, a third modulation order may be utilized for the third subband 410-*c*, and an nth modulation order may be utilized for the nth subband 410-*n*.

In some examples, a network entity 105-*a* or UE 115-*a* may determine or communicate a configuration of one or more quantities of MIMO layers for one or more of the optical subbands 410. For instance, a network entity 105-*a* or UE 115-*a* may determine or communicate a configuration indicating 4 MIMO layers (e.g., a first TB with 4 MIMO layers) for the first subband 410-*a*, 4 MIMO layers (e.g., a second TB with 4 MIMO layers) for the second subband 410-*b*, 2 MIMO layers (e.g., a third TB with 2 MIMO layers) for the third subband 410-*c*, and 1 MIMO layer (e.g., a fourth TB with 1 MIMO layer) for the nth subband 410-*n*.

In some examples, a network entity 105-*a* or UE 115-*a* may determine or communicate ACK/NACK for one or more of the optical subbands 410. For instance, a network entity 105-*a* or UE 115-*a* may determine or communicate ACK/NACK for one or more respective TBs (e.g., an entire TB) corresponding to one or more of the subbands. In some approaches, ACK/NACK processing or communication may be performed on the basis of individual subbands, one or more groups of subbands, or a combination thereof. For instance, first ACK/NACK may be determined or communicated for the first subband 410-*a*, second ACK/NACK may be determined or communicated for a group of the second subband 410-*b* and the third subband 410-*c*, and third ACK/NACK may be determined or communicated for the nth subband 410-*n*.

Figure 5:
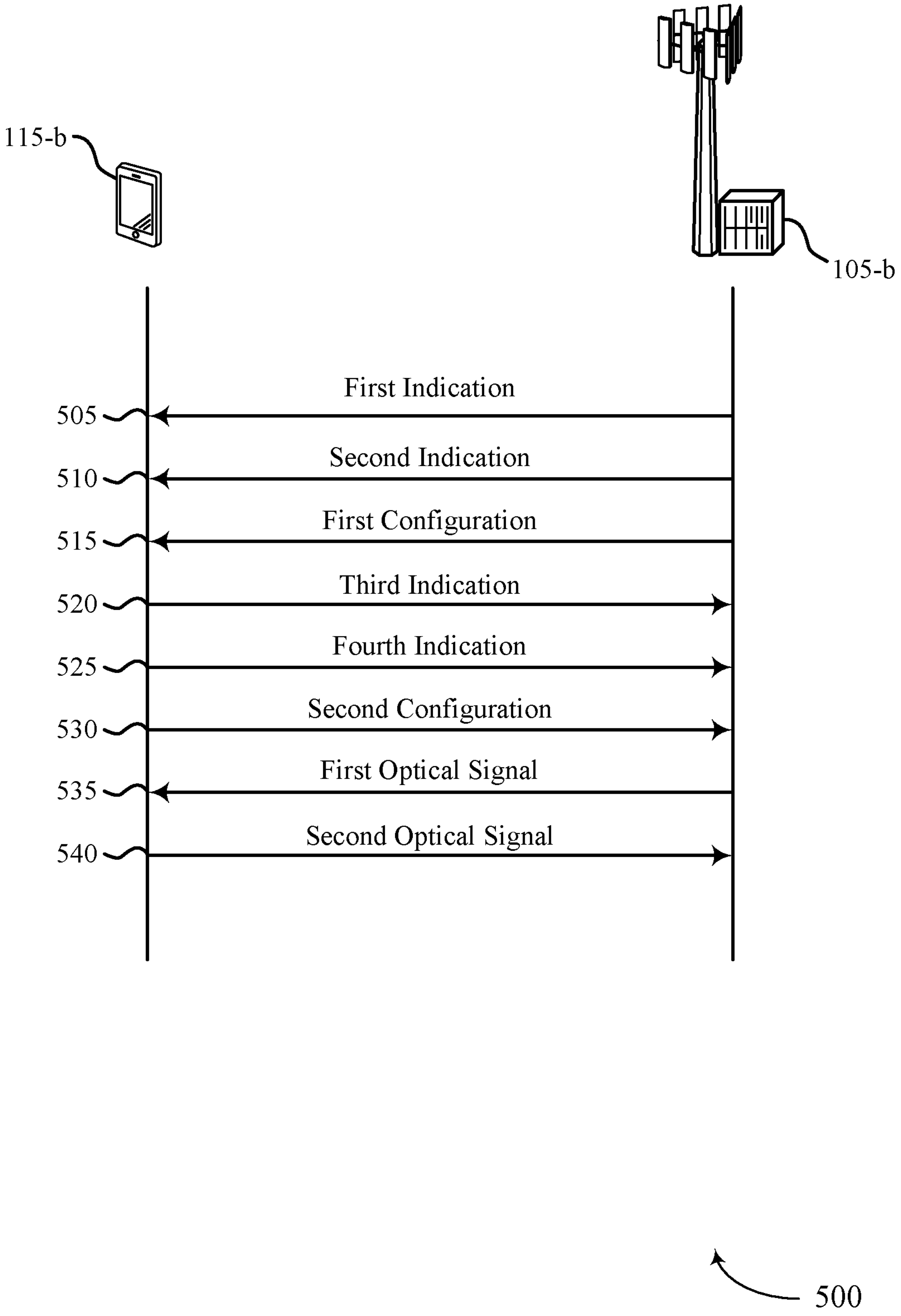
FIG. 5 shows an example of a process flow that supports subband-based processing for optical channels in accordance with one or more aspects of the present disclosure.

FIG. 5 shows an example of a process flow 500 that supports subband-based processing for optical channels in accordance with one or more aspects of the present disclosure. In some examples, aspects of the process flow 500 may implement or be implemented by aspects of the wireless communications system 100 or the wireless communications system 200. For example, the process flow 500 may be implemented by a UE 115-*b* or a network entity 105-*b*, which may be examples of the corresponding devices as described herein with reference to FIGS. 1 and 2. In the following description of the process flow 500, the operations between the network entity 105-*b* and the UE 115-*b* may be performed in a different order than the example order shown. Some operations may also be omitted from the process flow 500, or other operations may be added to the process flow 500. Further, although some operations or signaling may be shown to occur at different times for discussion purposes, these operations may actually occur at the same time.

At 505, the network entity 105-*b* may output, or the UE 115-*b* may receive, a first indication of a first OFE. For instance, the first indication may be communicated as described with reference to FIG. 2.

At 510, the network entity 105-*b* may output, or the UE 115-*b* may receive, a second indication of a first operating point. For instance, the second indication may be communicated as described with reference to FIG. 2.

At 515, the network entity 105-*b* may output, or the UE 115-*b* may receive, information indicating a first configuration. For instance, the information indicating the first configuration may be communicated as described with reference to FIG. 2.

At 520, the UE 115-*b* may transmit, or the network entity 105-*b* may obtain, a third indication of a second OFE. For instance, the third indication may be communicated as described with reference to FIG. 2.

At 525, the UE 115-*b* may transmit, or the network entity 105-*b* may obtain, a fourth indication of a second operating point. For instance, the fourth indication may be communicated as described with reference to FIG. 2.

At 530, the UE 115-*b* may transmit, or the network entity 105-*b* may obtain, information indicating a second configuration. For instance, the information indicating the second configuration may be communicated as described with reference to FIG. 2.

At 535, the network entity 105-*b* may output, or the UE 115-*b* may receive, a first optical signal. For instance, the first optical signal may be communicated (based on one or more of the indications or configurations) as described with reference to FIG. 2.

At 540, the UE 115-*b* may transmit, or the network entity 105-*b* may obtain, a second optical signal. For instance, the first optical signal may be communicated (based on one or more of the indications or configurations) as described with reference to FIG. 2.

Figure 6:
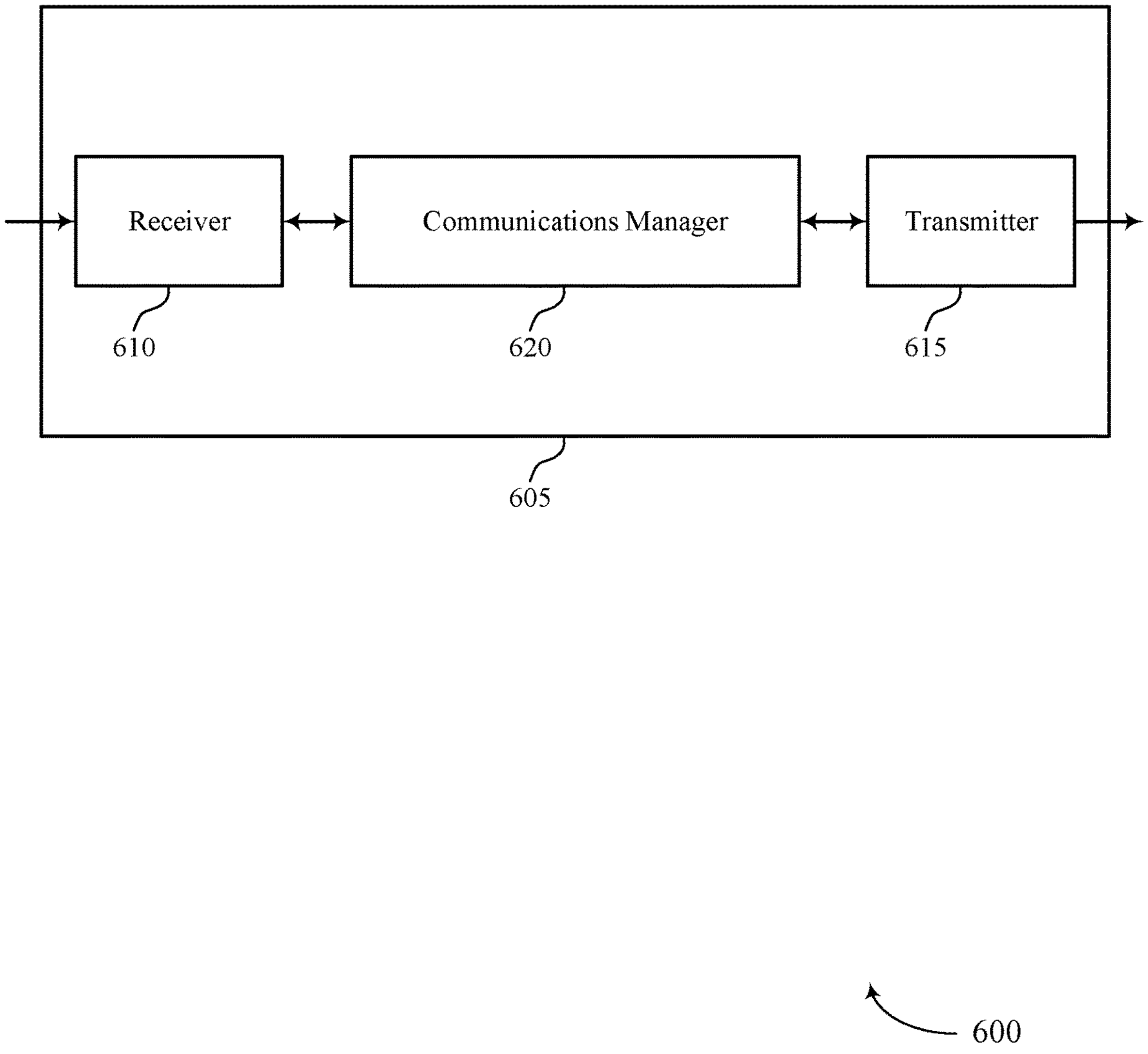
FIGS. 6 and 7 show block diagrams of devices that support subband-based processing for optical channels in accordance with one or more aspects of the present disclosure.

FIG. 6 shows a block diagram 600 of a device 605 that supports subband-based processing for optical channels in accordance with one or more aspects of the present disclosure. The device 605 may be an example of aspects of a UE 115, UE 115-*a*, or UE 115-*b* as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to subband-based processing for optical channels). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to subband-based processing for optical channels). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of subband-based processing for optical channels as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for communicating, with a network entity, a first indication of an OFE and a second indication of an operating point for communicating optical signaling via an optical channel with the network entity. The communications manager 620 is capable of, configured to, or operable to support a means for communicating, with the network entity, information indicating a configuration of one or more optical subbands associated with the optical channel, the one or more optical subbands being based on the OFE and the operating point. The communications manager 620 is capable of, configured to, or operable to support a means for communicating, with the network entity, one or more optical signals via the optical channel based on the configuration of the one or more optical subbands.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for more efficient utilization of communication resources.

Figure 7:
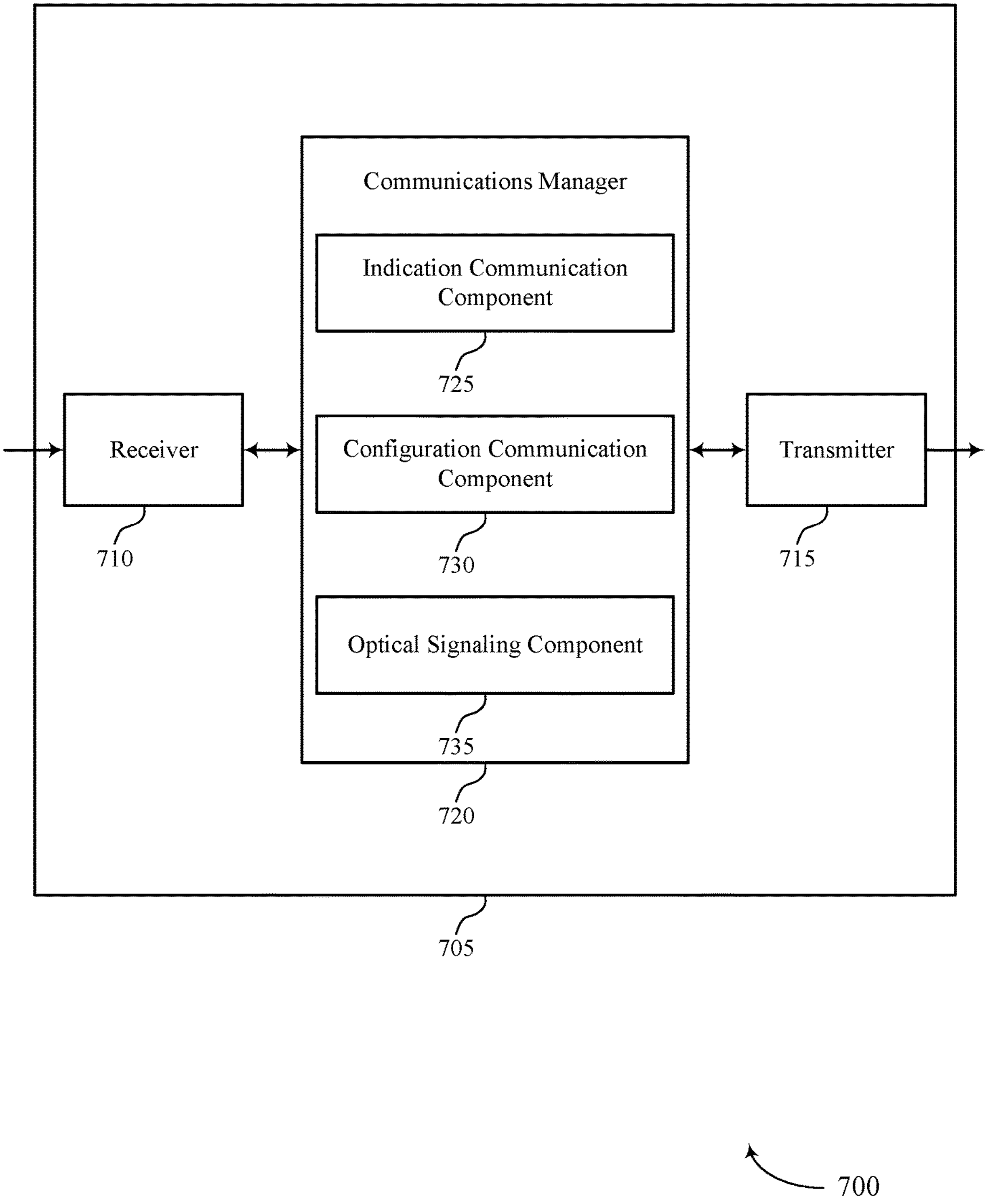

FIG. 7 shows a block diagram 700 of a device 705 that supports subband-based processing for optical channels in accordance with one or more aspects of the present disclosure. The device 705 may be an example of aspects of a device 605, a UE 115, a UE 115-*a*, or a UE 115-*b* as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to subband-based processing for optical channels). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to subband-based processing for optical channels). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of subband-based processing for optical channels as described herein. For example, the communications manager 720 may include an indication communication component 725, a configuration communication component 730, an optical signaling component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The indication communication component 725 is capable of, configured to, or operable to support a means for communicating, with a network entity, a first indication of an OFE and a second indication of an operating point for communicating optical signaling via an optical channel with the network entity. The configuration communication component 730 is capable of, configured to, or operable to support a means for communicating, with the network entity, information indicating a configuration of one or more optical subbands associated with the optical channel, the one or more optical subbands being based on the OFE and the operating point. The optical signaling component 735 is capable of, configured to, or operable to support a means for communicating, with the network entity, one or more optical signals via the optical channel based on the configuration of the one or more optical subbands.

Figure 8:
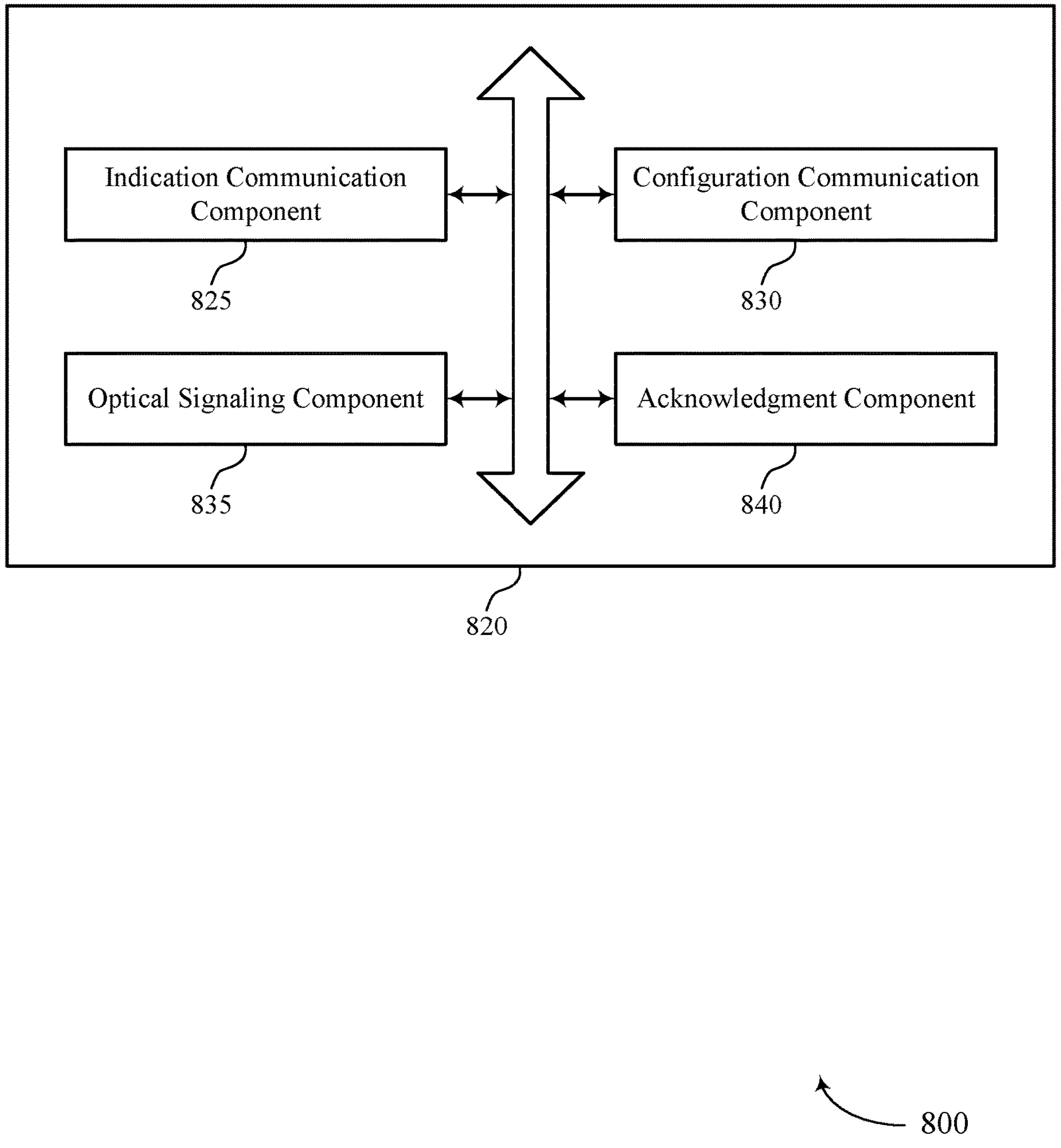
FIG. 8 shows a block diagram of a communications manager that supports subband-based processing for optical channels in accordance with one or more aspects of the present disclosure.

FIG. 8 shows a block diagram 800 of a communications manager 820 that supports subband-based processing for optical channels in accordance with one or more aspects of the present disclosure. The communications manager 820 may be an example of aspects of a communications manager 620, a communications manager 720, or both, as described herein. The communications manager 820, or various components thereof, may be an example of means for performing various aspects of subband-based processing for optical channels as described herein. For example, the communications manager 820 may include an indication communication component 825, a configuration communication component 830, an optical signaling component 835, an acknowledgment component 840, or any combination thereof. Each of these components, or components or sub-components thereof (e.g., one or more processors, one or more memories), may communicate, directly or indirectly, with one another (e.g., via one or more buses).

The communications manager 820 may support wireless communications in accordance with examples as disclosed herein. The indication communication component 825 is capable of, configured to, or operable to support a means for communicating, with a network entity, a first indication of an OFE and a second indication of an operating point for communicating optical signaling via an optical channel with the network entity. The configuration communication component 830 is capable of, configured to, or operable to support a means for communicating, with the network entity, information indicating a configuration of one or more optical subbands associated with the optical channel, the one or more optical subbands being based on the OFE and the operating point. The optical signaling component 835 is capable of, configured to, or operable to support a means for communicating, with the network entity, one or more optical signals via the optical channel based on the configuration of the one or more optical subbands.

In some examples, to support communicating the information indicating the configuration, the indication communication component 825 is capable of, configured to, or operable to support a means for communicating an indication of a frequency range and an indication of a location in a resource block for at least one of the one or more optical subbands associated with the optical channel.

In some examples, to support communicating the information indicating the configuration, the indication communication component 825 is capable of, configured to, or operable to support a means for communicating an indication of a quantity of the one or more optical subbands associated with the optical channel.

In some examples, to support communicating the information indicating the configuration, the indication communication component 825 is capable of, configured to, or operable to support a means for communicating an indication of a first frequency and a second frequency for at least one of the one or more optical subbands associated with the optical channel.

In some examples, the OFE and the operating point correspond to the network entity. In some examples, the optical channel is a downlink optical channel.

In some examples, the indication communication component 825 is capable of, configured to, or operable to support a means for communicating, with the network entity, a third indication of a second OFE corresponding to the UE, and a fourth indication of a second operating point for communicating second optical signaling via an uplink optical channel with the network entity. In some examples, the configuration communication component 830 is capable of, configured to, or operable to support a means for communicating, with the network entity, second information indicating a second configuration of one or more second optical subbands associated with the uplink optical channel, the one or more second optical subbands being based on the second OFE and the second operating point. In some examples, the optical signaling component 835 is capable of, configured to, or operable to support a means for communicating, with the network entity, one or more second optical signals via the uplink optical channel based on the second configuration of the one or more second optical subbands.

In some examples, the configuration communication component 830 is capable of, configured to, or operable to support a means for communicating, with the network entity, second information indicating a second configuration of one or more transport blocks for communication via the optical channel.

In some examples, to support communicating the second information, the configuration communication component 830 is capable of, configured to, or operable to support a means for communicating an indication of a mapping between the one or more transport blocks and the one or more optical subbands, each transport block being associated with at least one of the one or more optical subbands.

In some examples, to support communicating the second information, the configuration communication component 830 is capable of, configured to, or operable to support a means for communicating an indication of a first MCS associated with a first transport block and a first optical subband, and an indication of a second MCS associated with a second transport block and a second optical subband.

In some examples, the second MCS associated with the second transport block is indicated relative to the first MCS associated with the first transport block.

In some examples, the configuration communication component 830 is capable of, configured to, or operable to support a means for communicating an indication of a mapping of a first modulation order to a first optical subband of the one or more optical subbands.

In some examples, a second modulation order corresponding to a second subband is indicated relative to the first modulation order corresponding to a first subband.

In some examples, the acknowledgment component 840 is capable of, configured to, or operable to support a means for transmitting, to the network entity, an ACK/NACK of a first transport block with one or more modulation orders associated with at least one of the one or more optical subbands.

In some examples, to support communicating the one or more optical signals, the optical signaling component 835 is capable of, configured to, or operable to support a means for receiving a first transport block corresponding to a first optical subband with a first modulation order and a second optical subband with a second modulation order. In some examples, to support communicating the one or more optical signals, the optical signaling component 835 is capable of, configured to, or operable to support a means for receiving a second transport block corresponding to a third optical subband with a third modulation order and a fourth optical subband with a fourth modulation order.

In some examples, to support communicating the one or more optical signals, the optical signaling component 835 is capable of, configured to, or operable to support a means for receiving a first transport block corresponding to a first optical subband via a first layer. In some examples, to support communicating the one or more optical signals, the optical signaling component 835 is capable of, configured to, or operable to support a means for receiving a second transport block corresponding to a second optical subband via a second layer.

Figure 9:
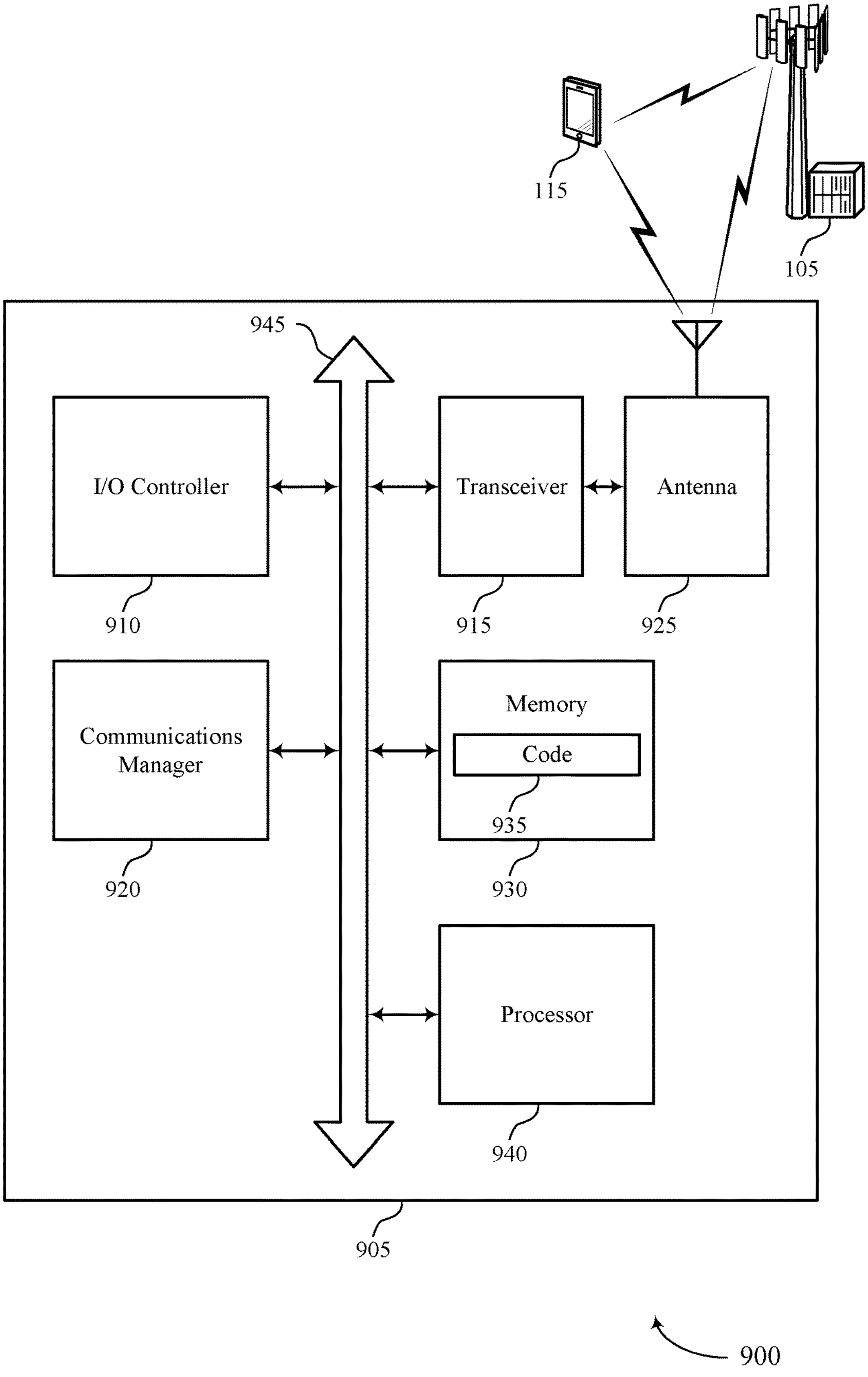
FIG. 9 shows a diagram of a system including a device that supports subband-based processing for optical channels in accordance with one or more aspects of the present disclosure.

FIG. 9 shows a diagram of a system 900 including a device 905 that supports subband-based processing for optical channels in accordance with one or more aspects of the present disclosure. The device 905 may be an example of or include components of a device 605, a device 705, a UE 115, a UE 115-*a*, or a UE 115-*b* as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 or optical components using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting subband-based processing for optical channels). For example, the device 905 or a component of the device 905 may include at least one processor 940 and at least one memory 930 coupled with or to the at least one processor 940, the at least one processor 940 and the at least one memory 930 configured to perform various functions described herein.

In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for communicating, with a network entity, a first indication of an OFE and a second indication of an operating point for communicating optical signaling via an optical channel with the network entity. The communications manager 920 is capable of, configured to, or operable to support a means for communicating, with the network entity, information indicating a configuration of one or more optical subbands associated with the optical channel, the one or more optical subbands being based on the OFE and the operating point. The communications manager 920 is capable of, configured to, or operable to support a means for communicating, with the network entity, one or more optical signals via the optical channel based on the configuration of the one or more optical subbands.

By including or configuring the communications manager 920 in accordance with examples as described herein, the device 905 may support techniques for improved communication reliability, reduced latency, more efficient utilization of communication resources, improved coordination between devices, or improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of subband-based processing for optical channels as described herein, or the at least one processor 940 and the at least one memory 930 may be otherwise configured to, individually or collectively, perform or support such operations.

Figure 10:
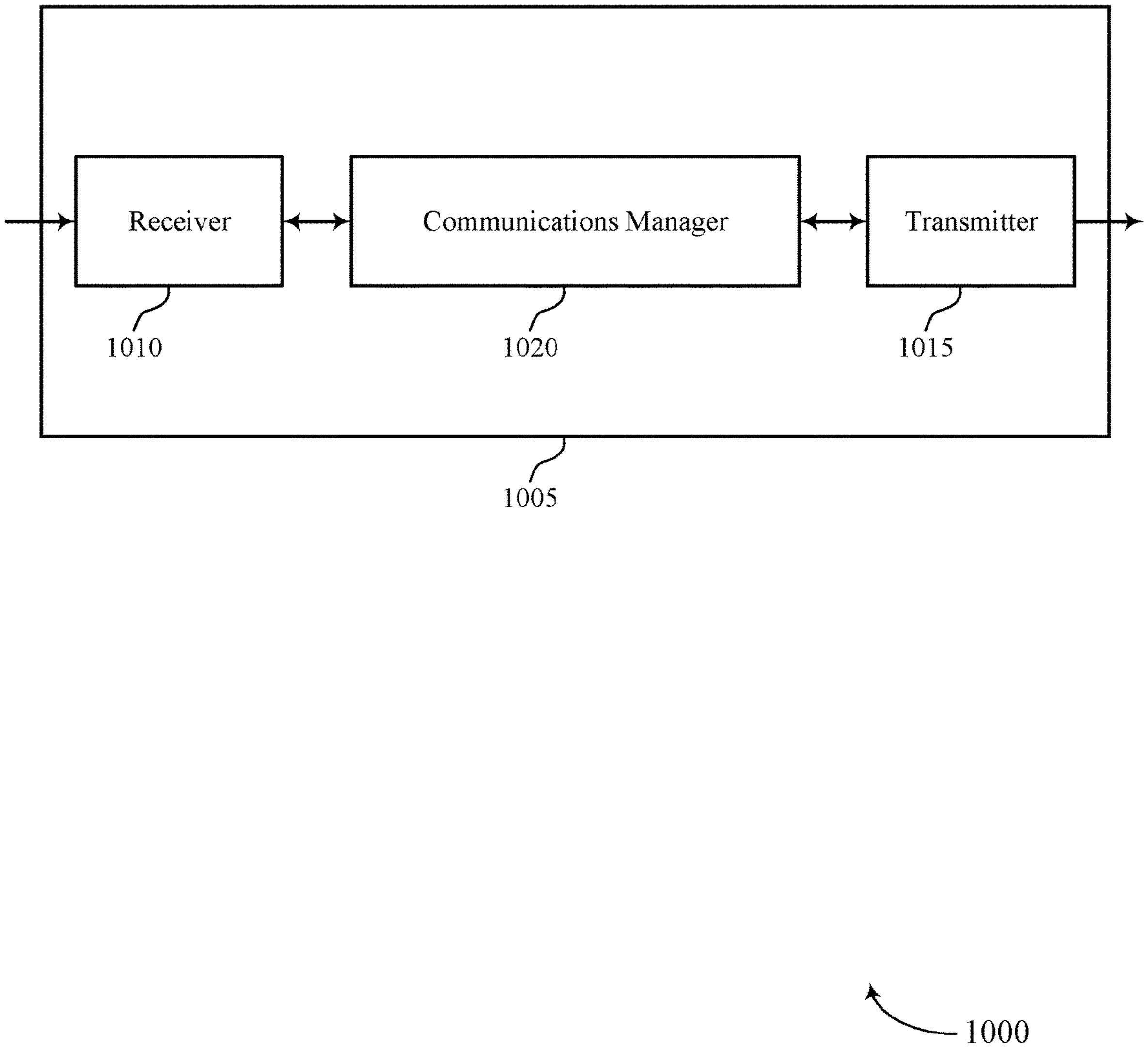
FIGS. 10 and 11 show block diagrams of devices that support subband-based processing for optical channels in accordance with one or more aspects of the present disclosure.

FIG. 10 shows a block diagram 1000 of a device 1005 that supports subband-based processing for optical channels in accordance with one or more aspects of the present disclosure. The device 1005 may be an example of aspects of a network entity 105, network entity 105-*a*, or network entity 105-*b* as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations or components thereof may be examples of means for performing various aspects of subband-based processing for optical channels as described herein. For example, the communications manager 1020, the receiver 1010, the transmitter

1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for communicating, with a UE, a first indication of an OFE and a second indication of an operating point for communicating optical signaling via an optical channel with the UE. The communications manager 1020 is capable of, configured to, or operable to support a means for communicating, with the UE, information indicating a configuration of one or more optical subbands associated with the optical channel, the one or more optical subbands being based on the OFE and the operating point. The communications manager 1020 is capable of, configured to, or operable to support a means for communicating, with the UE, one or more optical signals via the optical channel based on the configuration of the one or more optical subbands.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for more efficient utilization of communication resources.

Figure 11:
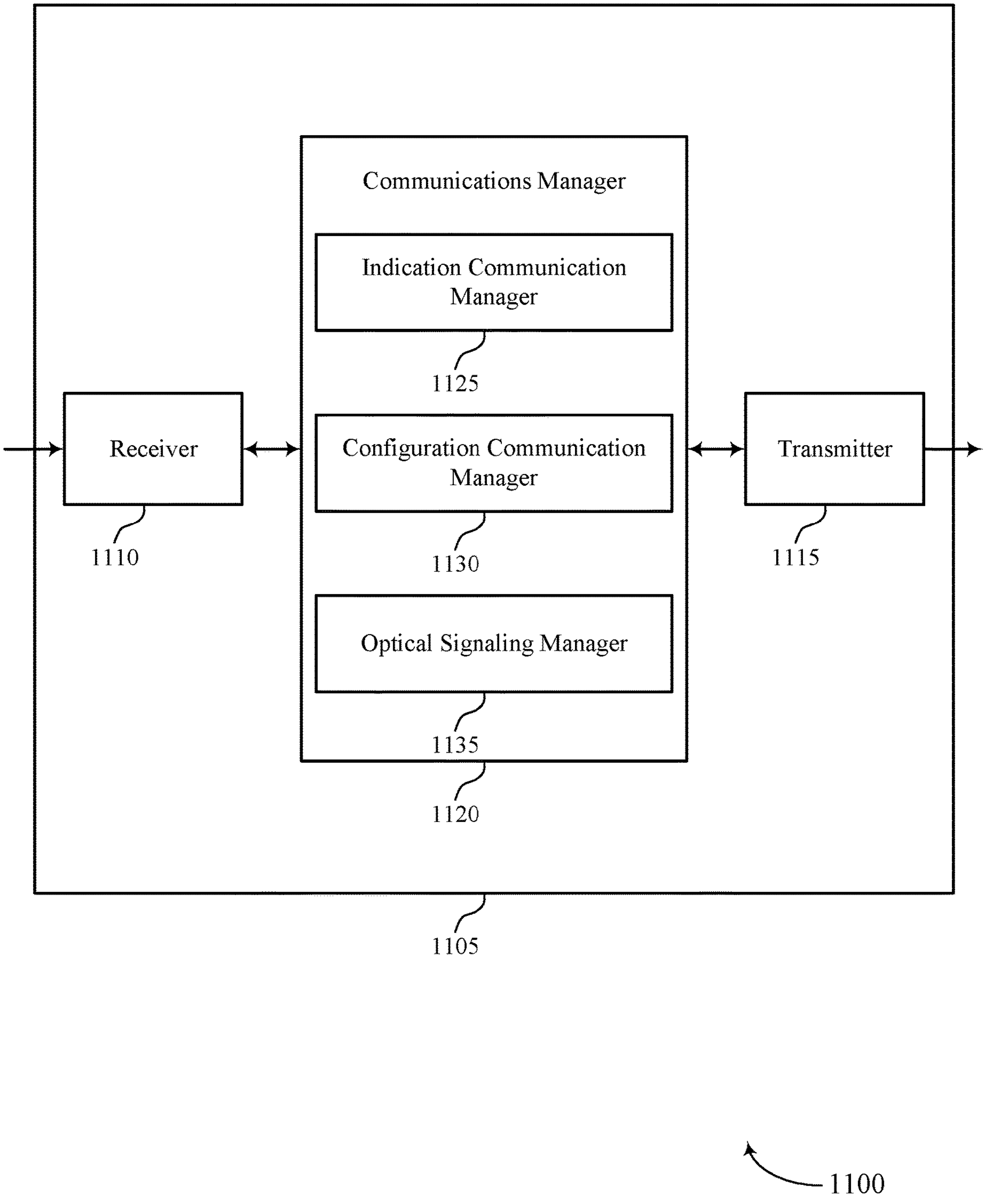

FIG. 11 shows a block diagram 1100 of a device 1105 that supports subband-based processing for optical channels in accordance with one or more aspects of the present disclosure. The device 1105 may be an example of aspects of a device 1005, a network entity 105, network entity 105-*a*, or network entity 105-*b* as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of subband-based processing for optical channels as described herein. For example, the communications manager 1120 may include an indication communication manager 1125, a configuration communication manager 1130, an optical signaling manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The indication communication manager 1125 is capable of, configured to, or operable to support a means for communicating, with a UE, a first indication of an OFE and a second indication of an operating point for communicating optical signaling via an optical channel with the UE. The configuration communication manager 1130 is capable of, configured to, or operable to support a means for communicating, with the UE, information indicating a configuration of one or more optical subbands associated with the optical channel, the one or more optical subbands being based on the OFE and the operating point. The optical signaling manager 1135 is capable of, configured to, or operable to support a means for communicating, with the UE, one or more optical signals via the optical channel based on the configuration of the one or more optical subbands.

Figure 12:
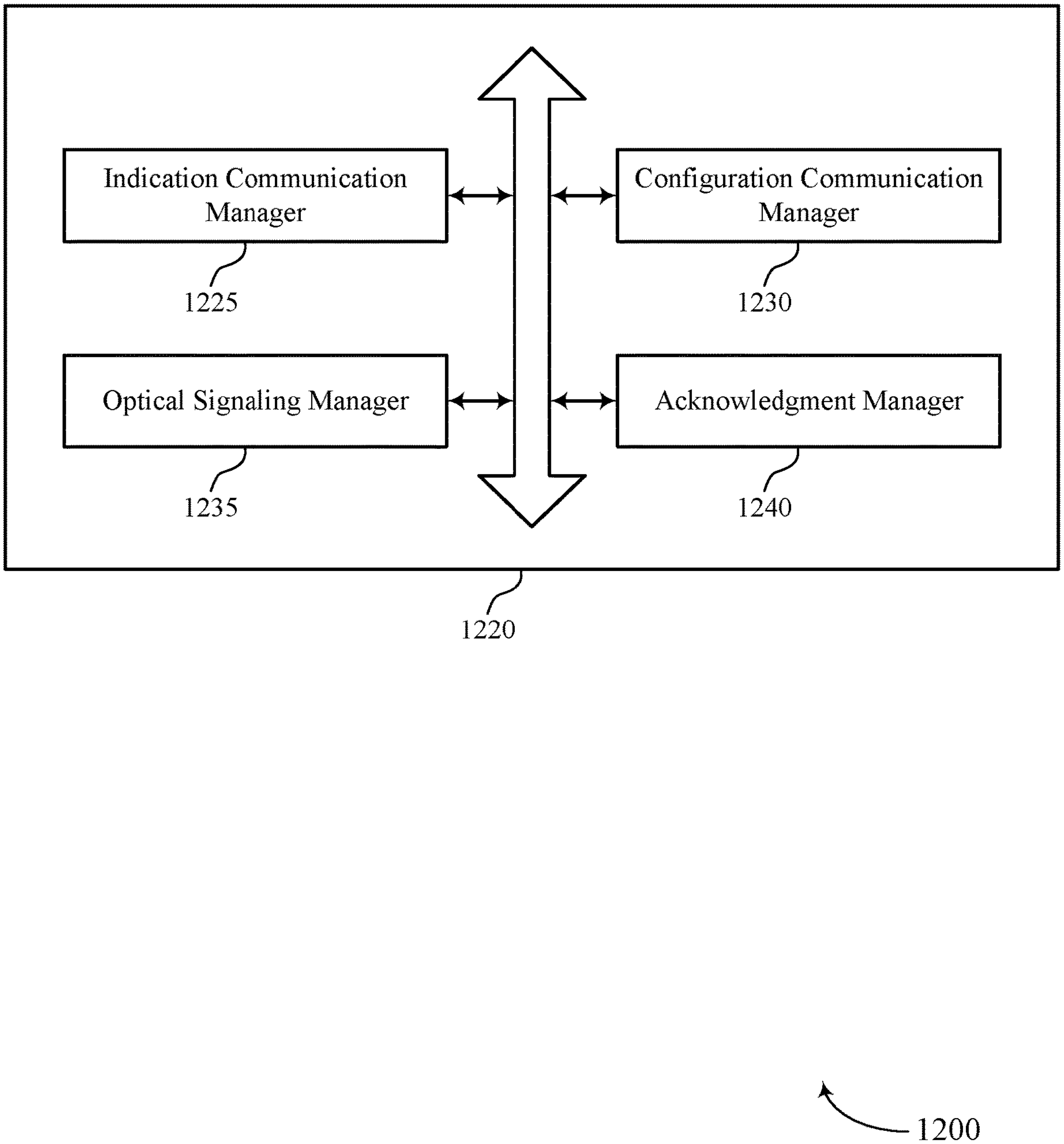
FIG. 12 shows a block diagram of a communications manager that supports subband-based processing for optical channels in accordance with one or more aspects of the present disclosure.

FIG. 12 shows a block diagram 1200 of a communications manager 1220 that supports subband-based processing for optical channels in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of subband-based processing for optical channels as described herein. For example, the communications manager 1220 may include an indication communication manager 1225, a configuration communication manager 1230, an optical signaling manager 1235, an acknowledgment manager 1240, or any combination thereof. Each of these components, or components or sub-components thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The indication communication manager 1225 is capable of, configured to, or operable to support a means for communicating, with a UE, a first indication of an OFE and a second indication of an operating point for communicating optical signaling via an optical channel with the UE. The configuration communication manager 1230 is capable of, configured to, or operable to support a means for communicating, with the UE, information indicating a configuration of one or more optical subbands associated with the optical channel, the one or more optical subbands being based on the OFE and the operating point. The optical signaling manager 1235 is capable of, configured to, or operable to support a means for communicating, with the UE, one or more optical signals via the optical channel based on the configuration of the one or more optical subbands.

In some examples, to support communicating the information indicating the configuration, the indication communication manager 1225 is capable of, configured to, or operable to support a means for communicating an indication of a frequency range and an indication of a location in a resource block for at least one of the one or more optical subbands associated with the optical channel.

In some examples, to support communicating the information indicating the configuration, the indication communication manager 1225 is capable of, configured to, or operable to support a means for communicating an indication of a quantity of the one or more optical subbands associated with the optical channel.

In some examples, to support communicating the information indicating the configuration, the indication communication manager 1225 is capable of, configured to, or operable to support a means for communicating an indication of a first frequency and a second frequency for at least one of the one or more optical subbands associated with the optical channel.

In some examples, the indication communication manager 1225 is capable of, configured to, or operable to support a means for communicating, with the UE, a third indication of a second OFE corresponding to the UE, and a fourth indication of a second operating point for communicating second optical signaling via an uplink optical channel with the UE. In some examples, the configuration communication manager 1230 is capable of, configured to, or operable to support a means for communicating, with the UE, second information indicating a second configuration of one or more second optical subbands associated with the uplink optical channel, the one or more second optical subbands being based on the second OFE and the second operating point. In some examples, the optical signaling manager 1235 is capable of, configured to, or operable to support a means for communicating, with the UE, one or more second optical signals via the uplink optical channel based on the second configuration of the one or more second optical subbands.

In some examples, the configuration communication manager 1230 is capable of, configured to, or operable to support a means for communicating, with the UE, second information indicating a second configuration of one or more transport blocks for communication via the optical channel.

In some examples, to support communicating the second information, the configuration communication manager 1230 is capable of, configured to, or operable to support a means for communicating an indication of a mapping between the one or more transport blocks and the one or more optical subbands, each transport block being associated with at least one of the one or more optical subbands.

In some examples, to support communicating the second information, the configuration communication manager 1230 is capable of, configured to, or operable to support a means for communicating an indication of a first MCS associated with a first transport block and a first optical subband, and an indication of a second MCS associated with a second transport block and a second optical subband.

In some examples, a size of a first transport block is based on a quantity of resource blocks associated with a first optical subband.

In some examples, the configuration communication manager 1230 is capable of, configured to, or operable to support a means for communicating an indication of a mapping of a first modulation order to a first optical subband of the one or more optical subbands.

In some examples, the acknowledgment manager 1240 is capable of, configured to, or operable to support a means for obtaining, from the UE, an ACK/NACK of a first transport block with one or more modulation orders associated with at least one of the one or more optical subbands.

In some examples, to support communicating the one or more optical signals, the optical signaling manager 1235 is capable of, configured to, or operable to support a means for outputting a first transport block corresponding to a first optical subband with a first modulation order and a second optical subband with a second modulation order. In some examples, to support communicating the one or more optical signals, the optical signaling manager 1235 is capable of, configured to, or operable to support a means for outputting a second transport block corresponding to a third optical subband with a third modulation order and a fourth optical subband with a fourth modulation order.

In some examples, to support communicating the one or more optical signals, the optical signaling manager 1235 is capable of, configured to, or operable to support a means for outputting a first transport block corresponding to a first optical subband via a first layer. In some examples, to support communicating the one or more optical signals, the optical signaling manager 1235 is capable of, configured to, or operable to support a means for outputting a second transport block corresponding to a second optical subband via a second layer.

Figure 13:
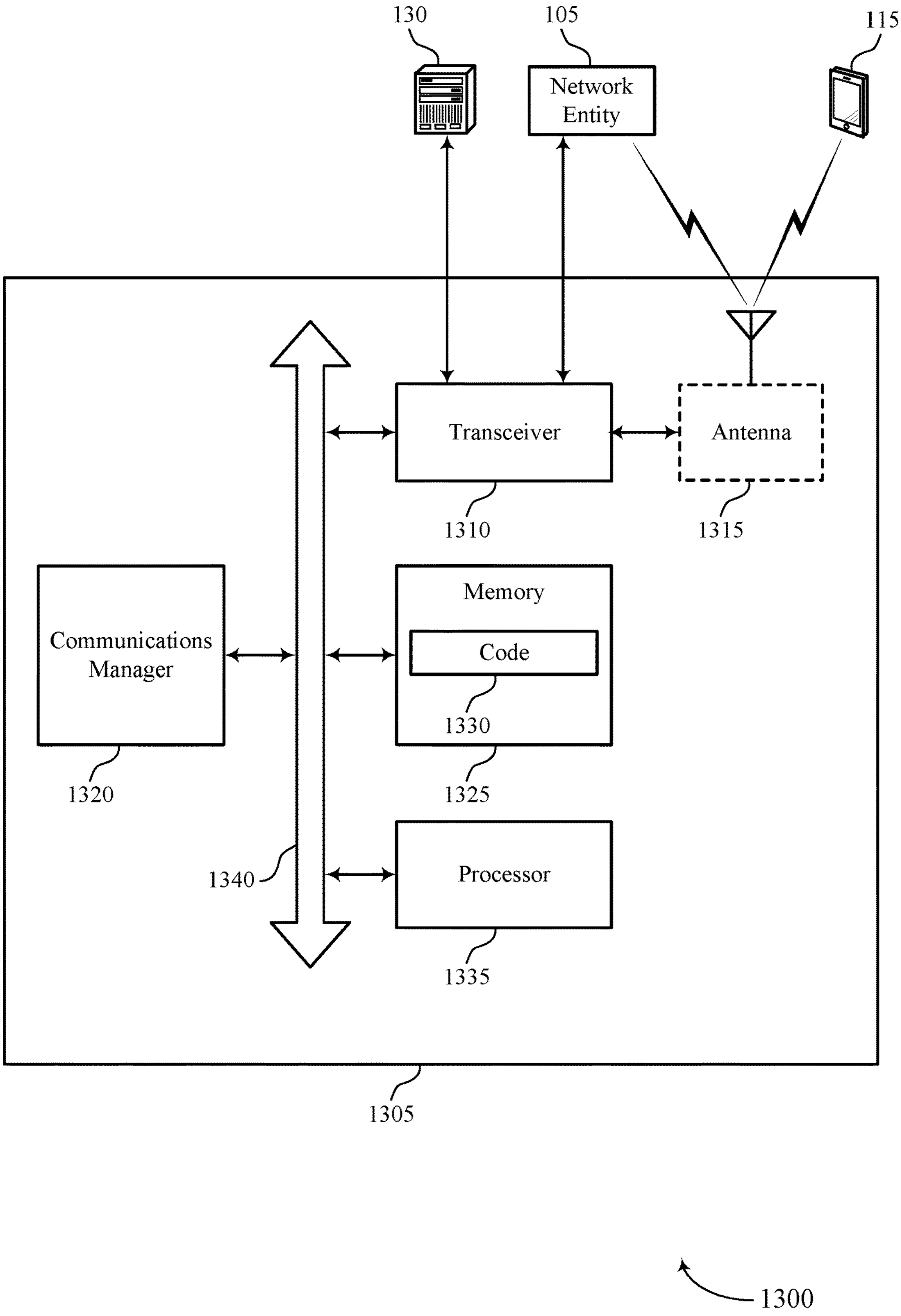
FIG. 13 shows a diagram of a system including a device that supports subband-based processing for optical channels in accordance with one or more aspects of the present disclosure.

FIG. 13 shows a diagram of a system 1300 including a device 1305 that supports subband-based processing for optical channels in accordance with one or more aspects of the present disclosure. The device 1305 may be an example of or include components of a device 1005, a device 1105, a network entity 105, a network entity 105-*a*, or a network entity 105-*b* as described herein. The device 1305 may communicate with other network devices or network equipment such as one or more of the network entities 105, UEs 115, or any combination thereof. The communications may include communications over one or more wired interfaces, over one or more wireless interfaces, or any combination thereof. The device 1305 may include components that support outputting and obtaining communications, such as a communications manager 1320, a transceiver 1310, one or more antennas 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315 or optical components, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., communication link(s) 125, backhaul communication link(s) 120, a midhaul communication link 162, a fronthaul communication link 168).

The at least one memory 1325 may include RAM, ROM, or any combination thereof. The at least one memory 1325 may store computer-readable, computer-executable, or processor-executable code, such as the code 1330. The code 1330 may include instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may include, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting subband-based processing for optical channels). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325).

In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being “configured to,” being “configurable to,” and being “operable to” may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with one or more other network entities 105, and may include a controller or scheduler for controlling communications with UEs 115 (e.g., in cooperation with the one or more other network devices). In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for communicating, with a UE, a first indication of an OFE and a second indication of an operating point for communicating optical signaling via an optical channel with the UE. The communications manager 1320 is capable of, configured to, or operable to support a means for communicating, with the UE, information indicating a configuration of one or more optical subbands associated with the optical channel, the one or more optical subbands being based on the OFE and the operating point. The communications manager 1320 is capable of, configured to, or operable to support a means for communicating, with the UE, one or more optical signals via the optical channel based on the configuration of the one or more optical subbands.

By including or configuring the communications manager 1320 in accordance with examples as described herein, the device 1305 may support techniques for improved communication reliability, reduced latency, more efficient utilization of communication resources, improved coordination between devices, or improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of subband-based processing for optical channels as described herein, or the at least one processor 1335 and the at least one memory 1325 may be otherwise configured to, individually or collectively, perform or support such operations.

Figure 14:
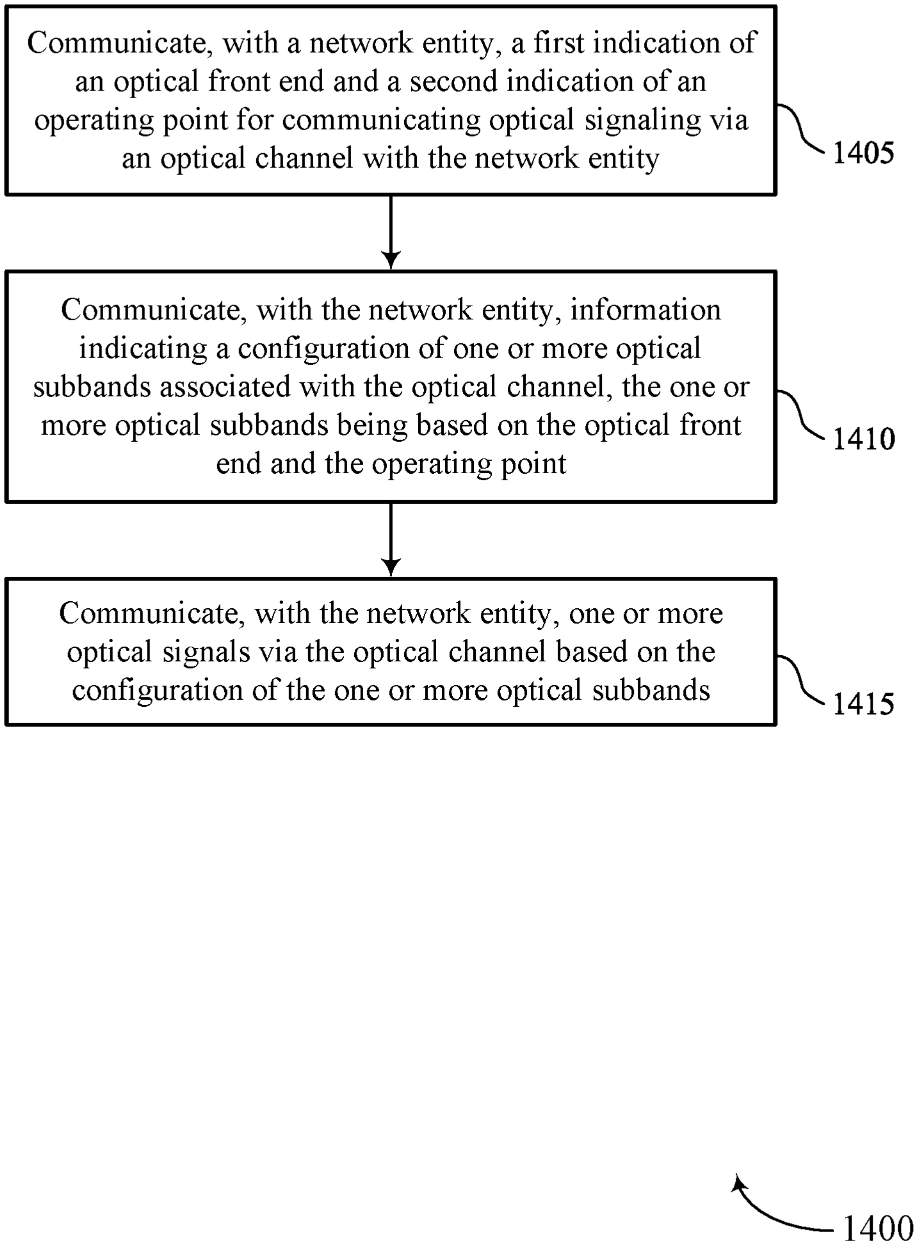
FIGS. 14 through 17 show flowcharts illustrating methods that support subband-based processing for optical channels in accordance with one or more aspects of the present disclosure.

FIG. 14 shows a flowchart illustrating a method 1400 that supports subband-based processing for optical channels in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include communicating, with a network entity, a first indication of an OFE and a second indication of an operating point for communicating optical signaling via an optical channel with the network entity. The operations of 1405 may be performed in accordance with examples as disclosed herein. In some examples, aspects of the operations of 1405 may be performed by an indication communication component 825 as described with reference to FIG. 8.

At 1410, the method may include communicating, with the network entity, information indicating a configuration of one or more optical subbands associated with the optical channel, the one or more optical subbands being based on the OFE and the operating point. The operations of 1410 may be performed in accordance with examples as disclosed herein. In some examples, aspects of the operations of 1410 may be performed by a configuration communication component 830 as described with reference to FIG. 8.

At 1415, the method may include communicating, with the network entity, one or more optical signals via the optical channel based on the configuration of the one or more optical subbands. The operations of 1415 may be performed in accordance with examples as disclosed herein. In some examples, aspects of the operations of 1415 may be performed by an optical signaling component 835 as described with reference to FIG. 8.

Figure 15:
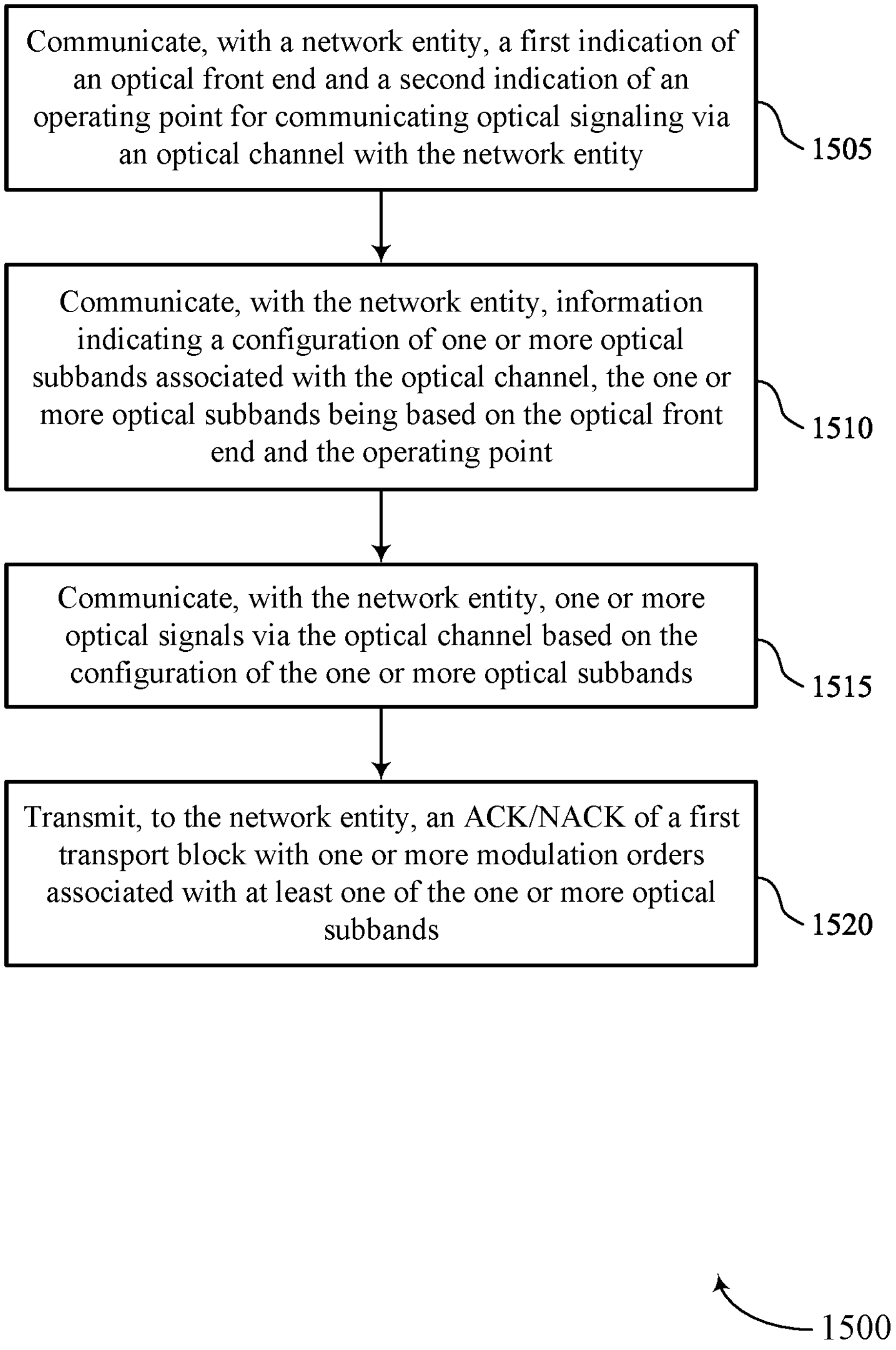

FIG. 15 shows a flowchart illustrating a method 1500 that supports subband-based processing for optical channels in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include communicating, with a network entity, a first indication of an OFE and a second indication of an operating point for communicating optical signaling via an optical channel with the network entity. The operations of 1505 may be performed in accordance with examples as disclosed herein. In some examples, aspects of the operations of 1505 may be performed by an indication communication component 825 as described with reference to FIG. 8.

At 1510, the method may include communicating, with the network entity, information indicating a configuration of one or more optical subbands associated with the optical channel, the one or more optical subbands being based on the OFE and the operating point. The operations of 1510 may be performed in accordance with examples as disclosed herein. In some examples, aspects of the operations of 1510 may be performed by a configuration communication component 830 as described with reference to FIG. 8.

At 1515, the method may include communicating, with the network entity, one or more optical signals via the optical channel based on the configuration of the one or more optical subbands. The operations of 1515 may be performed in accordance with examples as disclosed herein. In some examples, aspects of the operations of 1515 may be performed by an optical signaling component 835 as described with reference to FIG. 8.

At 1520, the method may include transmitting, to the network entity, an ACK/NACK of a first transport block with one or more modulation orders associated with at least one of the one or more optical subbands. The operations of 1520 may be performed in accordance with examples as disclosed herein. In some examples, aspects of the operations of 1520 may be performed by an acknowledgment component 840 as described with reference to FIG. 8.

Figure 16:
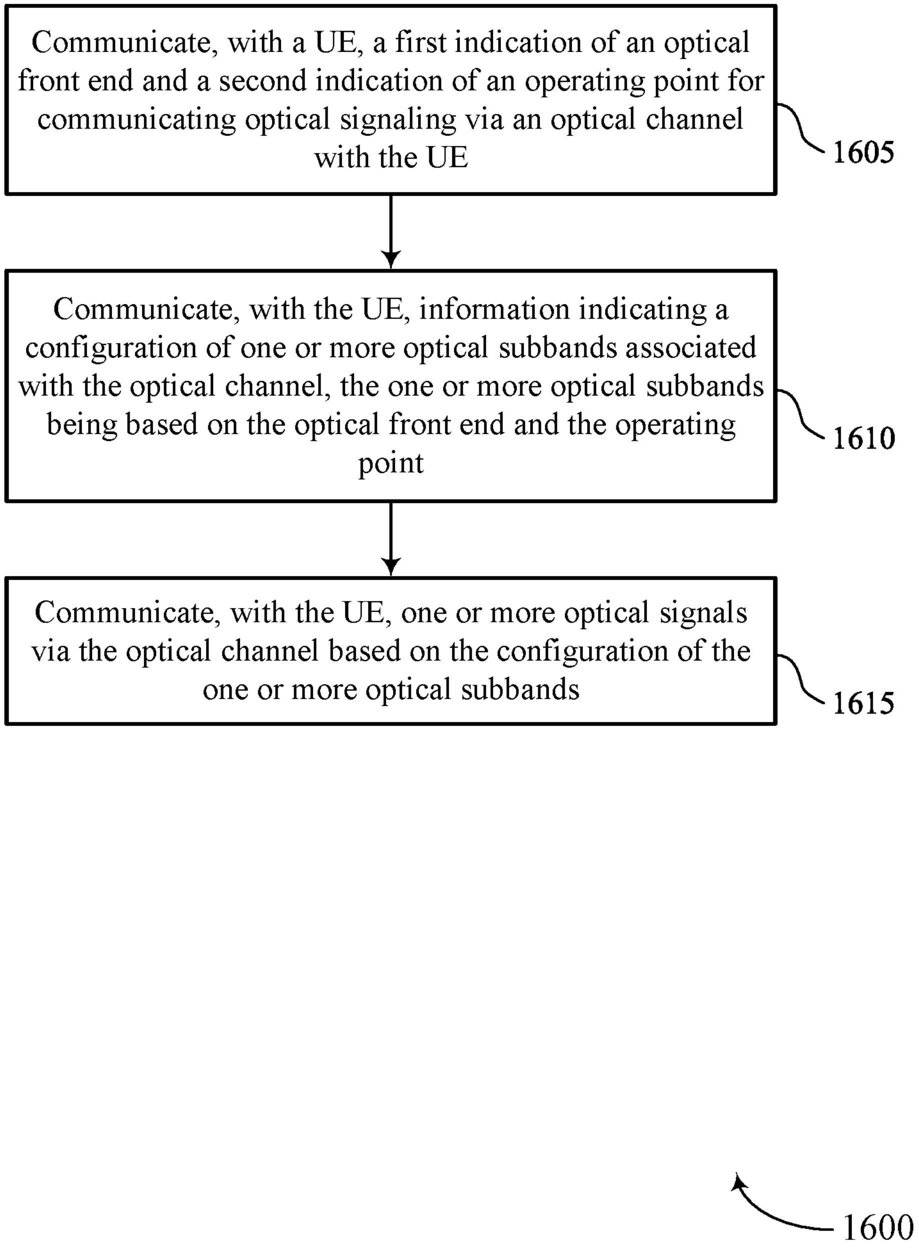

FIG. 16 shows a flowchart illustrating a method 1600 that supports subband-based processing for optical channels in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include communicating, with a UE, a first indication of an OFE and a second indication of an operating point for communicating optical signaling via an optical channel with the UE. The operations of 1605 may be performed in accordance with examples as disclosed herein. In some examples, aspects of the operations of 1605 may be performed by an indication communication manager 1225 as described with reference to FIG. 12.

At 1610, the method may include communicating, with the UE, information indicating a configuration of one or more optical subbands associated with the optical channel, the one or more optical subbands being based on the OFE and the operating point. The operations of 1610 may be performed in accordance with examples as disclosed herein. In some examples, aspects of the operations of 1610 may be performed by a configuration communication manager 1230 as described with reference to FIG. 12.

At 1615, the method may include communicating, with the UE, one or more optical signals via the optical channel based on the configuration of the one or more optical subbands. The operations of 1615 may be performed in accordance with examples as disclosed herein. In some examples, aspects of the operations of 1615 may be performed by an optical signaling manager 1235 as described with reference to FIG. 12.

Figure 17:
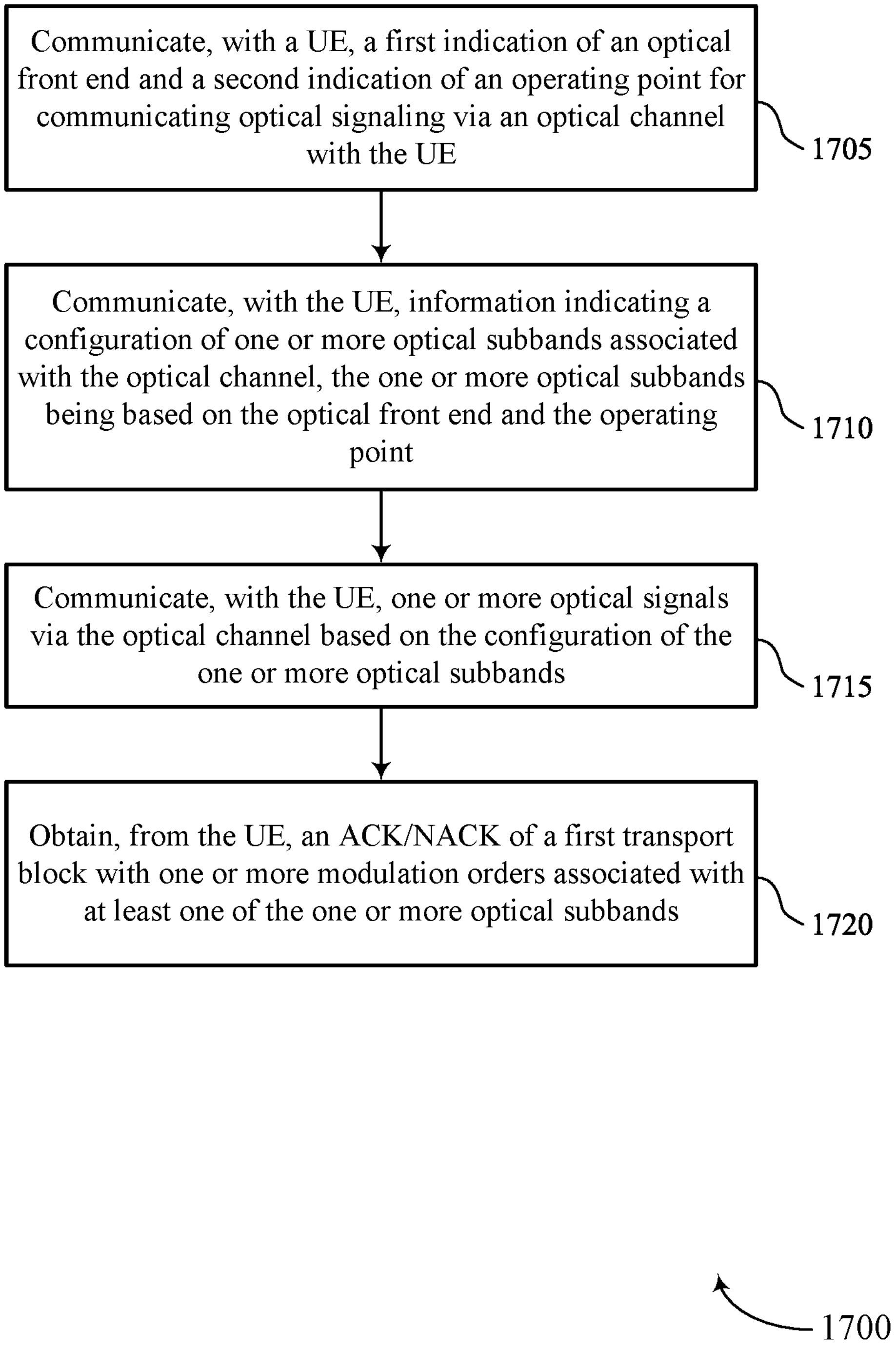

FIG. 17 shows a flowchart illustrating a method 1700 that supports subband-based processing for optical channels in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include communicating, with a UE, a first indication of an OFE and a second indication of an operating point for communicating optical signaling via an optical channel with the UE. The operations of 1705 may be performed in accordance with examples as disclosed herein. In some examples, aspects of the operations of 1705 may be performed by an indication communication manager 1225 as described with reference to FIG. 12.

At 1710, the method may include communicating, with the UE, information indicating a configuration of one or more optical subbands associated with the optical channel, the one or more optical subbands being based on the OFE and the operating point. The operations of 1710 may be performed in accordance with examples as disclosed herein. In some examples, aspects of the operations of 1710 may be performed by a configuration communication manager 1230 as described with reference to FIG. 12.

At 1715, the method may include communicating, with the UE, one or more optical signals via the optical channel based on the configuration of the one or more optical subbands. The operations of 1715 may be performed in accordance with examples as disclosed herein. In some examples, aspects of the operations of 1715 may be performed by an optical signaling manager 1235 as described with reference to FIG. 12.

At 1720, the method may include obtaining, from the UE, an ACK/NACK of a first transport block with one or more modulation orders associated with at least one of the one or more optical subbands. The operations of 1720 may be performed in accordance with examples as disclosed herein. In some examples, aspects of the operations of 1720 may be performed by an acknowledgment manager 1240 as described with reference to FIG. 12.

The following provides an overview of aspects of the present disclosure:

Aspect 1: A method for wireless communications at a UE, comprising: communicating, with a network entity, a first indication of an OFE and a second indication of an operating point for communicating optical signaling via an optical channel with the network entity; communicating, with the network entity, information indicating a configuration of one or more optical subbands associated with the optical channel, the one or more optical subbands being based at least in part on the OFE and the operating point; and communicating, with the network entity, one or more optical signals via the optical channel based at least in part on the configuration of the one or more optical subbands.

Aspect 2: The method of aspect 1, wherein communicating the information indicating the configuration comprises: communicating an indication of a frequency range and an indication of a location in a resource block for at least one of the one or more optical subbands associated with the optical channel.

Aspect 3: The method of any of aspects 1 through 2, wherein communicating the information indicating the configuration comprises: communicating an indication of a quantity of the one or more optical subbands associated with the optical channel.

Aspect 4: The method of any of aspects 1 through 3, wherein communicating the information indicating the configuration comprises: communicating an indication of a first frequency and a second frequency for at least one of the one or more optical subbands associated with the optical channel.

Aspect 5: The method of any of aspects 1 through 4, wherein the OFE and the operating point correspond to the network entity, and the optical channel is a downlink optical channel.

Aspect 6: The method of aspect 5, further comprising: communicating, with the network entity, a third indication of a second OFE corresponding to the UE, and a fourth indication of a second operating point for communicating second optical signaling via an uplink optical channel with the network entity; communicating, with the network entity, second information indicating a second configuration of one or more second optical subbands associated with the uplink optical channel, the one or more second optical subbands being based at least in part on the second OFE and the second operating point; and communicating, with the network entity, one or more second optical signals via the uplink optical channel based at least in part on the second configuration of the one or more second optical subbands.

Aspect 7: The method of any of aspects 1 through 6, further comprising: communicating, with the network entity, second information indicating a second configuration of one or more transport blocks for communication via the optical channel.

Aspect 8: The method of aspect 7, wherein communicating the second information comprises: communicating an indication of a mapping between the one or more transport blocks and the one or more optical subbands, each transport block being associated with at least one of the one or more optical subbands.

Aspect 9: The method of any of aspects 7 through 8, wherein communicating the second information comprises: communicating an indication of a first MCS associated with a first transport block and a first optical subband, and an indication of a second MCS associated with a second transport block and a second optical subband.

Aspect 10: The method of aspect 9, wherein the second MCS associated with the second transport block is indicated relative to the first MCS associated with the first transport block.

Aspect 11: The method of any of aspects 1 through 10, further comprising: communicating an indication of a mapping of a first modulation order to a first optical subband of the one or more optical subbands.

Aspect 12: The method of aspect 11, wherein a second modulation order corresponding to a second subband is indicated relative to the first modulation order corresponding to a first subband.

Aspect 13: The method of any of aspects 1 through 12, further comprising: transmitting, to the network entity, an acknowledgment or negative acknowledgment of a first transport block with one or more modulation orders associated with at least one of the one or more optical subbands.

Aspect 14: The method of any of aspects 1 through 13, wherein communicating the one or more optical signals comprises: receiving a first transport block corresponding to a first optical subband with a first modulation order and a second optical subband with a second modulation order; and receiving a second transport block corresponding to a third optical subband with a third modulation order and a fourth optical subband with a fourth modulation order.

Aspect 15: The method of any of aspects 1 through 14, wherein communicating the one or more optical signals comprises: receiving a first transport block corresponding to a first optical subband via a first layer; and receiving a second transport block corresponding to a second optical subband via a second layer.

Aspect 16: A method for wireless communications at a network entity, comprising: communicating, with a UE, a first indication of an OFE and a second indication of an operating point for communicating optical signaling via an optical channel with the UE; communicating, with the UE, information indicating a configuration of one or more optical subbands associated with the optical channel, the one or more optical subbands being based at least in part on the OFE and the operating point; and communicating, with the UE, one or more optical signals via the optical channel based at least in part on the configuration of the one or more optical subbands.

Aspect 17: The method of aspect 16, wherein communicating the information indicating the configuration comprises: communicating an indication of a frequency range and an indication of a location in a resource block for at least one of the one or more optical subbands associated with the optical channel.

Aspect 18: The method of any of aspects 16 through 17, wherein communicating the information indicating the configuration comprises: communicating an indication of a quantity of the one or more optical subbands associated with the optical channel.

Aspect 19: The method of any of aspects 16 through 18, wherein communicating the information indicating the configuration comprises: communicating an indication of a first frequency and a second frequency for at least one of the one or more optical subbands associated with the optical channel.

Aspect 20: The method of any of aspects 16 through 19, further comprising: communicating, with the UE, a third indication of a second OFE corresponding to the UE, and a fourth indication of a second operating point for communicating second optical signaling via an uplink optical channel with the UE; communicating, with the UE, second information indicating a second configuration of one or more second optical subbands associated with the uplink optical channel, the one or more second optical subbands being based at least in part on the second OFE and the second operating point; and communicating, with the UE, one or more second optical signals via the uplink optical channel based at least in part on the second configuration of the one or more second optical subbands.

Aspect 21: The method of any of aspects 16 through 20, further comprising: communicating, with the UE, second information indicating a second configuration of one or more transport blocks for communication via the optical channel.

Aspect 22: The method of aspect 21, wherein communicating the second information comprises: communicating an indication of a mapping between the one or more transport blocks and the one or more optical subbands, each transport block being associated with at least one of the one or more optical subbands.

Aspect 23: The method of any of aspects 21 through 22, wherein communicating the second information comprises: communicating an indication of a first MCS associated with a first transport block and a first optical subband, and an indication of a second MCS associated with a second transport block and a second optical subband.

Aspect 24: The method of any of aspects 21 through 23, wherein a size of a first transport block is based at least in part on a quantity of resource blocks associated with a first optical subband.

Aspect 25: The method of any of aspects 16 through 24, further comprising: communicating an indication of a mapping of a first modulation order to a first optical subband of the one or more optical subbands.

Aspect 26: The method of any of aspects 16 through 25, further comprising: obtaining, from the UE, an acknowledgment or negative acknowledgment of a first transport block with one or more modulation orders associated with at least one of the one or more optical subbands.

Aspect 27: The method of any of aspects 16 through 26, wherein communicating the one or more optical signals comprises: outputting a first transport block corresponding to a first optical subband with a first modulation order and a second optical subband with a second modulation order; and outputting a second transport block corresponding to a third optical subband with a third modulation order and a fourth optical subband with a fourth modulation order.

Aspect 28: The method of any of aspects 16 through 27, wherein communicating the one or more optical signals comprises: outputting a first transport block corresponding to a first optical subband via a first layer; and outputting a second transport block corresponding to a second optical subband via a second layer.

Aspect 29: An apparatus for wireless communications at a UE, comprising one or more processors and instructions stored in one or more memories and executable by the one or more processors, individually or collectively, to cause the apparatus to perform a method of any of aspects 1 through 15.

Aspect 30: An apparatus for wireless communications, comprising at least one means for performing a method of any of aspects 1 through 15.

Aspect 31: A non-transitory computer-readable medium storing code for wireless communications, the code comprising instructions executable by one or more processors to perform a method of any of aspects 1 through 15.

Aspect 32: An apparatus for wireless communications at a network entity, comprising one or more processors and instructions stored in one or more memories and executable by the one or more processors, individually or collectively, to cause the apparatus to perform a method of any of aspects 16 through 28.

Aspect 33: An apparatus for wireless communications, comprising at least one means for performing a method of any of aspects 16 through 28.

Aspect 34: A non-transitory computer-readable medium storing code for wireless communications, the code comprising instructions executable by one or more processors to perform a method of any of aspects 16 through 28.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

one or more processors; and instructions stored in one or more memories and executable by the one or more processors, individually or collectively, to cause the apparatus to:

communicate, with a network entity, a first indication of an optical front end and a second indication of an operating point for communicating optical signaling via an optical channel with the network entity;

communicate, with the network entity, information indicating a configuration of one or more optical subbands associated with the optical channel, the one or more optical subbands being based at least in part on the optical front end and the operating point; and communicate, with the network entity, one or more optical signals via the optical channel based at least in part on the configuration of the one or more optical subbands.

2. The apparatus of claim 1, wherein, to communicate the information indicating the configuration, the instructions are executable by the one or more processors, individually or collectively, to cause the apparatus to:

communicate an indication of a frequency range and an indication of a location in a resource block for at least one of the one or more optical subbands associated with the optical channel.

3. The apparatus of claim 1, wherein, to communicate the information indicating the configuration, the instructions are executable by the one or more processors, individually or collectively, to cause the apparatus to:

communicate an indication of a quantity of the one or more optical subbands associated with the optical channel.

4. The apparatus of claim 1, wherein, to communicate the information indicating the configuration, the instructions are executable by the one or more processors, individually or collectively, to cause the apparatus to:

communicate an indication of a first frequency and a second frequency for at least one of the one or more optical subbands associated with the optical channel.

5. The apparatus of claim 1, wherein:

the optical front end and the operating point correspond to the network entity, and the optical channel is a downlink optical channel.

6. The apparatus of claim 5, wherein the instructions are further executable by the one or more processors, individually or collectively, to cause the apparatus to:

communicate, with the network entity, a third indication of a second optical front end corresponding to the UE, and a fourth indication of a second operating point for communicating second optical signaling via an uplink optical channel with the network entity;

communicate, with the network entity, second information indicating a second configuration of one or more second optical subbands associated with the uplink optical channel, the one or more second optical subbands being based at least in part on the second optical front end and the second operating point; and communicate, with the network entity, one or more second optical signals via the uplink optical channel based at least in part on the second configuration of the one or more second optical subbands.

7. The apparatus of claim 1, wherein the instructions are further executable by the one or more processors, individually or collectively, to cause the apparatus to:

communicate, with the network entity, second information indicating a second configuration of one or more transport blocks for communication via the optical channel.

8. The apparatus of claim 7, wherein, to communicate the second information, the instructions are executable by the one or more processors, individually or collectively, to cause the apparatus to:

communicate an indication of a mapping between the one or more transport blocks and the one or more optical subbands, each transport block being associated with at least one of the one or more optical subbands.

9. The apparatus of claim 7, wherein, to communicate the second information, the instructions are executable by the one or more processors, individually or collectively, to cause the apparatus to:

communicate an indication of a first modulation and coding scheme (MCS) associated with a first transport block and a first optical subband, and an indication of a second MCS associated with a second transport block and a second optical subband.

10. The apparatus of claim 9, wherein the second MCS associated with the second transport block is indicated relative to the first MCS associated with the first transport block.

11. The apparatus of claim 1, wherein the instructions are further executable by the one or more processors, individually or collectively, to cause the apparatus to:

communicate an indication of a mapping of a first modulation order to a first optical subband of the one or more optical subbands.

12. The apparatus of claim 11, wherein a second modulation order corresponding to a second subband is indicated relative to the first modulation order corresponding to a first subband.

13. The apparatus of claim 1, wherein the instructions are further executable by the one or more processors, individually or collectively, to cause the apparatus to:

transmit, to the network entity, an acknowledgment or negative acknowledgment of a first transport block with one or more modulation orders associated with at least one of the one or more optical subbands.

14. The apparatus of claim 1, wherein, to communicate the one or more optical signals, the instructions are executable by the one or more processors, individually or collectively, to cause the apparatus to:

receive a first transport block corresponding to a first optical subband with a first modulation order and a second optical subband with a second modulation order; and receive a second transport block corresponding to a third optical subband with a third modulation order and a fourth optical subband with a fourth modulation order.

15. The apparatus of claim 1, wherein, to communicate the one or more optical signals, the instructions are executable by the one or more processors, individually or collectively, to cause the apparatus to:

receive a first transport block corresponding to a first optical subband via a first layer; and receive a second transport block corresponding to a second optical subband via a second layer.

16. An apparatus for wireless communications at a network entity, comprising:

one or more processors; and instructions stored in one or more memories and executable by the one or more processors, individually or collectively, to cause the apparatus to:

communicate, with a user equipment (UE), a first indication of an optical front end and a second indication of an operating point for communicating optical signaling via an optical channel with the UE;

communicate, with the UE, information indicating a configuration of one or more optical subbands associated with the optical channel, the one or more optical subbands being based at least in part on the optical front end and the operating point; and communicate, with the UE, one or more optical signals via the optical channel based at least in part on the configuration of the one or more optical subbands.

17. The apparatus of claim 16, wherein, to communicate the information indicating the configuration, the instructions are executable by the one or more processors, individually or collectively, to cause the apparatus to:

communicate an indication of a frequency range and an indication of a location in a resource block for at least one of the one or more optical subbands associated with the optical channel.

18. The apparatus of claim 16, wherein, to communicate the information indicating the configuration, the instructions are executable by the one or more processors, individually or collectively, to cause the apparatus to:

communicate an indication of a quantity of the one or more optical subbands associated with the optical channel.

19. The apparatus of claim 16, wherein, to communicate the information indicating the configuration, the instructions are executable by the one or more processors, individually or collectively, to cause the apparatus to:

communicate an indication of a first frequency and a second frequency for at least one of the one or more optical subbands associated with the optical channel.

20. The apparatus of claim 16, wherein the instructions are further executable by the one or more processors, individually or collectively, to cause the apparatus to:

communicate, with the UE, a third indication of a second optical front end corresponding to the UE, and a fourth indication of a second operating point for communicating second optical signaling via an uplink optical channel with the UE;

communicate, with the UE, second information indicating a second configuration of one or more second optical subbands associated with the uplink optical channel, the one or more second optical subbands being based at least in part on the second optical front end and the second operating point; and communicate, with the UE, one or more second optical signals via the uplink optical channel based at least in part on the second configuration of the one or more second optical subbands.

21. The apparatus of claim 16, wherein the instructions are further executable by the one or more processors, individually or collectively, to cause the apparatus to:

communicate, with the UE, second information indicating a second configuration of one or more transport blocks for communication via the optical channel.

22. The apparatus of claim 21, wherein, to communicate the second information, the instructions are executable by the one or more processors, individually or collectively, to cause the apparatus to:

communicate an indication of a mapping between the one or more transport blocks and the one or more optical subbands, each transport block being associated with at least one of the one or more optical subbands.

23. The apparatus of claim 21, wherein, to communicate the second information, the instructions are executable by the one or more processors, individually or collectively, to cause the apparatus to:

communicate an indication of a first modulation and coding scheme (MCS) associated with a first transport block and a first optical subband, and an indication of a second MCS associated with a second transport block and a second optical subband.

24. The apparatus of claim 21, wherein a size of a first transport block is based at least in part on a quantity of resource blocks associated with a first optical subband.

25. The apparatus of claim 16, wherein the instructions are further executable by the one or more processors, individually or collectively, to cause the apparatus to:

communicate an indication of a mapping of a first modulation order to a first optical subband of the one or more optical subbands.

26. The apparatus of claim 16, wherein the instructions are further executable by the one or more processors, individually or collectively, to cause the apparatus to:

obtain, from the UE, an acknowledgment or negative acknowledgment of a first transport block with one or more modulation orders associated with at least one of the one or more optical subbands.

27. The apparatus of claim 16, wherein, to communicate the one or more optical signals, the instructions are executable by the one or more processors, individually or collectively, to cause the apparatus to:

output a first transport block corresponding to a first optical subband with a first modulation order and a second optical subband with a second modulation order; and output a second transport block corresponding to a third optical subband with a third modulation order and a fourth optical subband with a fourth modulation order.

28. The apparatus of claim 16, wherein, to communicate the one or more optical signals, the instructions are executable by the one or more processors, individually or collectively, to cause the apparatus to:

output a first transport block corresponding to a first optical subband via a first layer; and output a second transport block corresponding to a second optical subband via a second layer.

29. A method for wireless communications at a user equipment (UE), comprising:

communicating, with a network entity, a first indication of an optical front end and a second indication of an operating point for communicating optical signaling via an optical channel with the network entity;

communicating, with the network entity, information indicating a configuration of one or more optical subbands associated with the optical channel, the one or more optical subbands being based at least in part on the optical front end and the operating point; and communicating, with the network entity, one or more optical signals via the optical channel based at least in part on the configuration of the one or more optical subbands.

30. A method for wireless communications at a network entity, comprising:

communicating, with a user equipment (UE), a first indication of an optical front end and a second indication of an operating point for communicating optical signaling via an optical channel with the UE;

communicating, with the UE, information indicating a configuration of one or more optical subbands associated with the optical channel, the one or more optical subbands being based at least in part on the optical front end and the operating point; and communicating, with the UE, one or more optical signals via the optical channel based at least in part on the configuration of the one or more optical subbands.

* * * * *